United States Patent
Armstrong-Crews

(10) Patent No.: US 11,958,505 B2
(45) Date of Patent: Apr. 16, 2024

(54) IDENTIFYING THE POSITION OF A HORN HONK OR OTHER ACOUSTICAL INFORMATION USING MULTIPLE AUTONOMOUS VEHICLES

(71) Applicant: Waymo LLC, Mountain View, CA (US)

(72) Inventor: Nicholas Armstrong-Crews, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 683 days.

(21) Appl. No.: 16/934,132

(22) Filed: Jul. 21, 2020

(65) Prior Publication Data

US 2022/0024484 A1  Jan. 27, 2022

(51) Int. Cl.
*B60W 60/00* (2020.01)
*B60W 40/02* (2006.01)
(Continued)

(52) U.S. Cl.
CPC ........ *B60W 60/0016* (2020.02); *B60W 40/02* (2013.01); *B60W 50/06* (2013.01);
(Continued)

(58) Field of Classification Search
CPC .. B60W 60/0016; B60W 40/02; B60W 50/06; B60W 2420/54; B60W 2420/60;
(Continued)

(56) References Cited

U.S. PATENT DOCUMENTS 6,362,749 B1  3/2002  Brill
7,616,128 B2  11/2009  Ohno et al.
(Continued)

FOREIGN PATENT DOCUMENTS

JP  2007050724 A  3/2007
WO  2017151937 A1  9/2017

OTHER PUBLICATIONS

Bazilinskyy, P , et al., Take-over requests in highly automated driving: A crowdsourcing survey on auditory, vibrotactile, and visual displays, Transportation Research Part F, 2018, pp. 82-98.
(Continued)

*Primary Examiner* — Aryan E Weisenfeld
(74) *Attorney, Agent, or Firm* — Botos Churchill IP Law

(57) ABSTRACT

The technology relates to determining a source of a horn honk or other noise in an environment around one or more self-driving vehicles. Aspects of the technology leverage real-time information from a group of self-driving vehicles regarding received acoustical information. The location and pose of each self-driving vehicle in the group, along with the precise arrangement of acoustical sensors on each vehicle, can be used to triangulate or otherwise identify the actual location in the environment for the origin of the horn honk or other sound. Other sensor information, map data, and additional data can be used narrow down or refine the location of a likely noise source. Once the location and source of the noise is known, each self-driving vehicle can use that information to modify current driving operations and/or use it as part of a reinforcement learning approach for future driving situations.

22 Claims, 22 Drawing Sheets

(51) Int. Cl.
*B60W 50/06* (2006.01)
*G06N 5/04* (2023.01)
*G06N 20/00* (2019.01)
*G10L 25/51* (2013.01)
*H04R 1/40* (2006.01)
*H04R 3/00* (2006.01)

(52) U.S. Cl.
CPC .............. *G06N 5/04* (2013.01); *G06N 20/00* (2019.01); *G10L 25/51* (2013.01); *H04R 1/406* (2013.01); *H04R 3/005* (2013.01); *B60W 2420/54* (2013.01); *B60W 2556/45* (2020.02); *H04R 2201/401* (2013.01); *H04R 2499/13* (2013.01)

(58) Field of Classification Search
CPC ....... B60W 2556/45; G06N 3/08; G06N 5/04; G06N 20/00; G10L 25/51; H04R 1/20; H04R 1/32; H04R 1/40; H04R 1/406; H04R 3/005; H04R 2201/401; H04R 2499/13; H04R 2430/03; G01S 3/8083; G01S 5/0072
See application file for complete search history.

(56) References Cited

U.S. PATENT DOCUMENTS

| | | | |
|---|---|---|---|
| 7,750,814 | B2 | 7/2010 | Fisher et al. |
| 8,676,427 | B1 | 3/2014 | Ferguson et al. |
| 8,838,321 | B1 | 9/2014 | Ferguson |
| 9,278,689 | B1 | 3/2016 | Delp |
| 9,305,223 | B1 | 4/2016 | Ogale et al. |
| 9,397,630 | B2 | 7/2016 | Wang et al. |
| 9,704,397 | B1 | 7/2017 | Bjorklund et al. |
| 9,840,254 | B2 | 12/2017 | Gupta et al. |
| 10,061,013 | B2 | 8/2018 | Hermann et al. |
| 10,319,228 | B2 | 6/2019 | Silver et al. |
| 2001/0007969 | A1 | 7/2001 | Mizushima |
| 2002/0003470 | A1 | 1/2002 | Auerbach |
| 2008/0150755 | A1 | 6/2008 | Van et al. |
| 2009/0179774 | A1 | 7/2009 | Mohan et al. |
| 2014/0136096 | A1 | 5/2014 | Funayama et al. |
| 2014/0241126 | A1 | 8/2014 | Funayama et al. |
| 2015/0177363 | A1* | 6/2015 | Hermann .................. G01S 5/22 367/118 |
| 2016/0009222 | A1 | 1/2016 | Taylor |
| 2016/0070788 | A1 | 3/2016 | Vrazic |
| 2017/0249839 | A1 | 8/2017 | Becker et al. |
| 2018/0132052 | A1 | 5/2018 | Muench et al. |
| 2018/0211528 | A1 | 7/2018 | Seifert |
| 2019/0027032 | A1 | 1/2019 | Arunachalam |
| 2020/0207371 | A1* | 7/2020 | Dougherty ...... B60W 60/00186 |
| 2020/0398832 | A1* | 12/2020 | Tzirkel-Hancock ........................ B60W 30/0953 |
| 2021/0109187 | A1* | 4/2021 | Watt ........ H04R 3/005 |

OTHER PUBLICATIONS

Cartwright, Mark, et al., Investigating the Effect of Sound-Event Loudness On Crowdsourced Audio Annotations, New York University, 2018, pp. 1-5.

Cartwright, Mark, et al., Seeing Sound: Investigating the Effects of Visualizations and Complexity on Crowdsourced Audio Annotations, PACM on Human-Computer Interaction, vol. 1, No. CSCW, Article 29. Publication date: Nov. 2017.

Patil, Nikhil, Content Centric Crowdsourcing and Dissemination of Realtime Public Transportation Information, Department of Computer Science and Engineering, Indian Institute of Technology, 2014, pp. 1-53.

\* cited by examiner

150

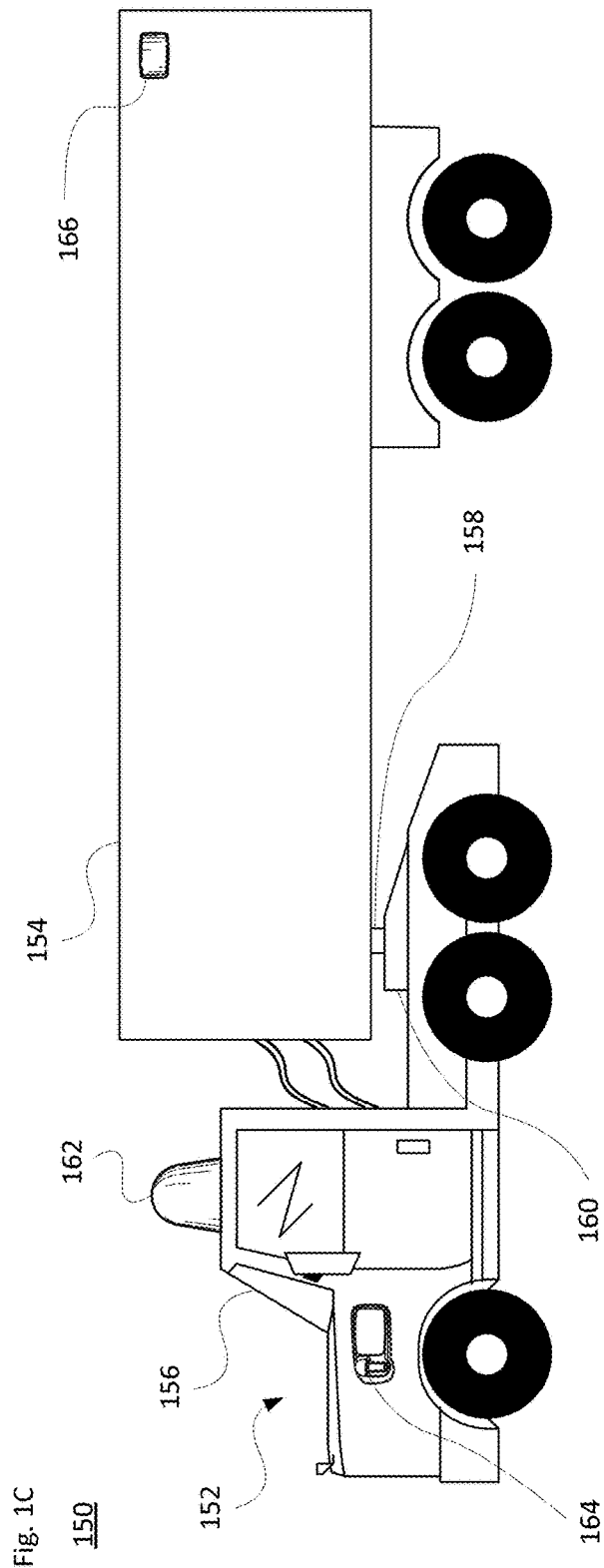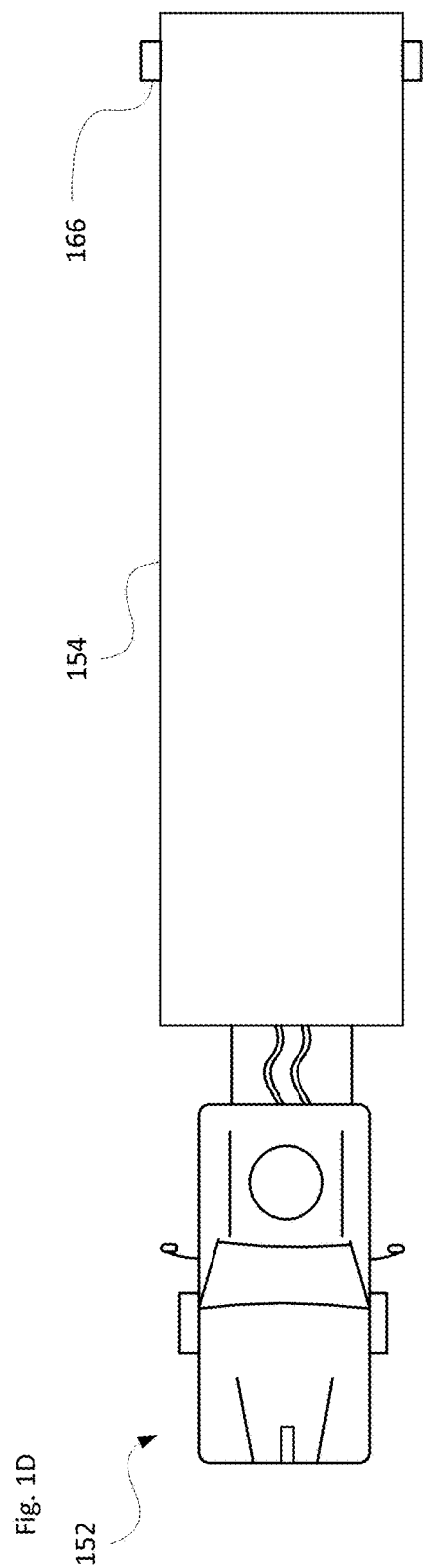

610

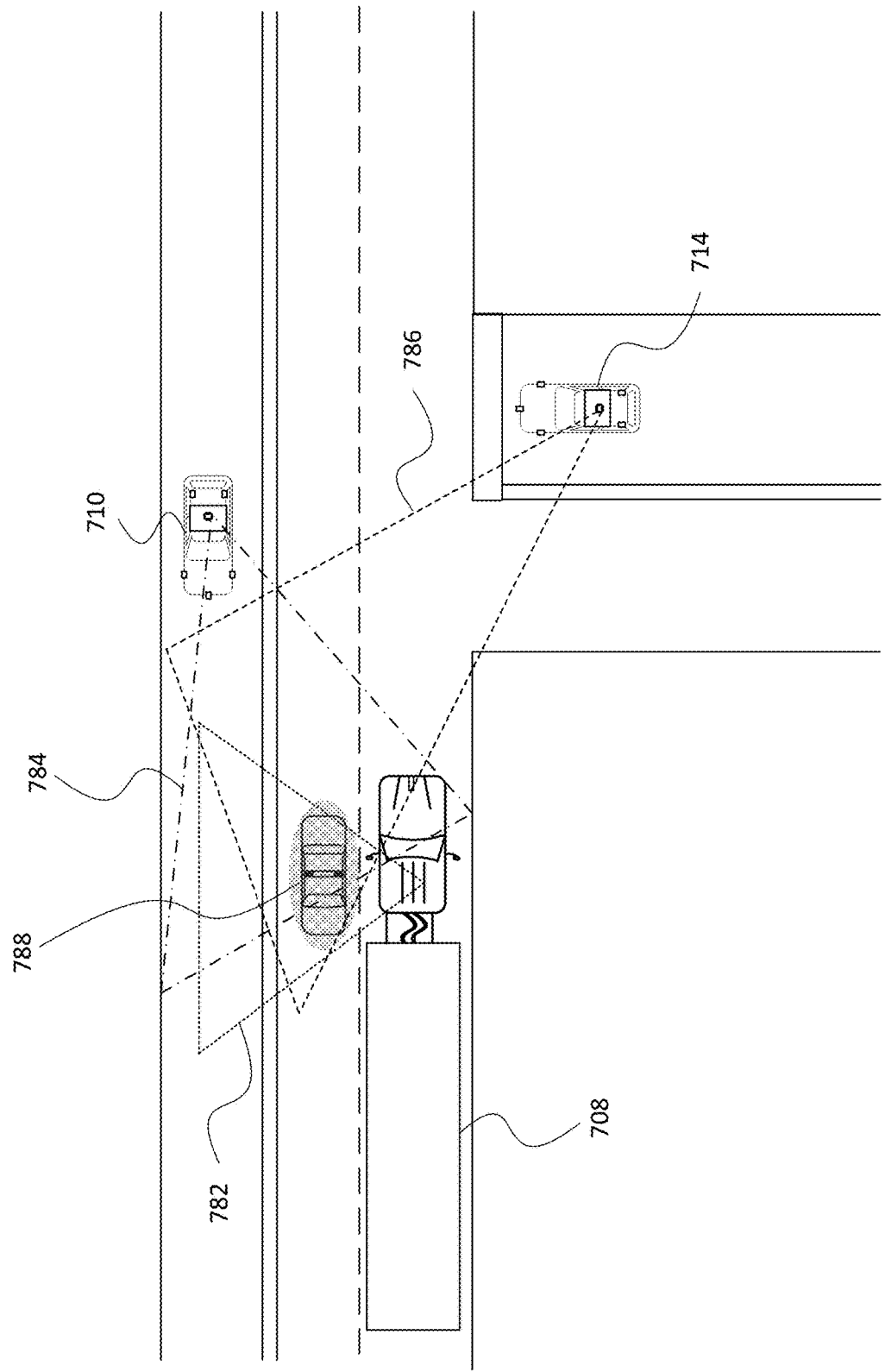

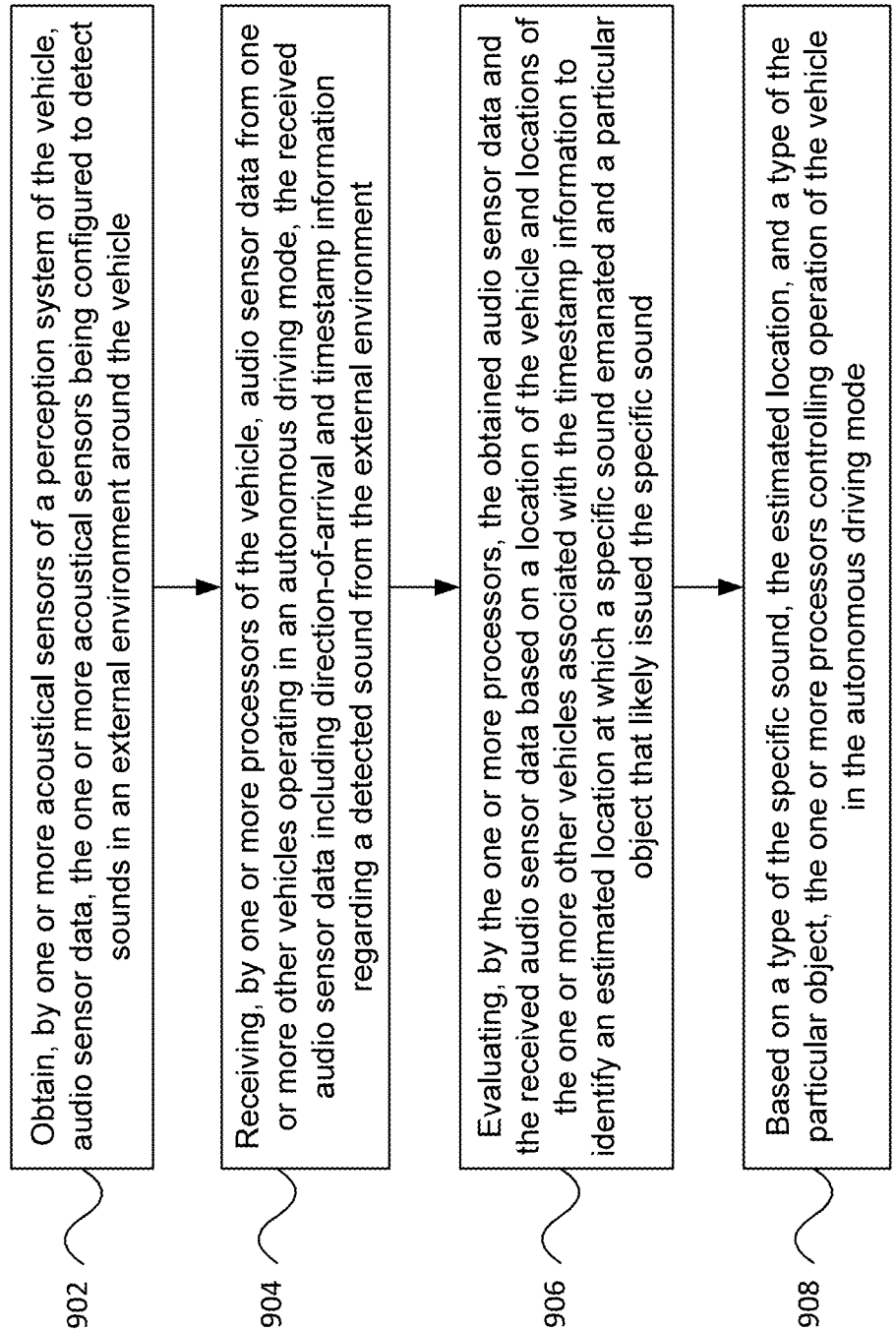

IDENTIFYING THE POSITION OF A HORN HONK OR OTHER ACOUSTICAL INFORMATION USING MULTIPLE AUTONOMOUS VEHICLES

BACKGROUND

Self-driving vehicles that operate in an autonomous driving mode may transport passengers, cargo or other items from one location to another. During operation, horn honks in the vehicle's external environment may provide insight into behavior of another vehicle that may or may not be operating in an autonomous driving mode, behavior of the self-driving vehicle itself, or interaction between the different vehicles. Unfortunately, it can be difficult to determine which other vehicle is honking, especially in a congested area, when the line-of-sight might be occluded, or in an otherwise noisy environment. The inability of the self-driving vehicle to properly determine which vehicle is honking or the reason for the honking may limit the ability of the self-driving vehicle to take corrective action or otherwise change its driving behavior.

BRIEF SUMMARY

The technology relates to approaches for determining what vehicle or other object in the environment is honking or issuing different acoustical information that may assist a self-driving vehicle in managing how it operates in an autonomous driving mode. In particular, aspects of the technology leverage real-time information from a group of self-driving vehicles regarding received acoustical information. The location and pose (e.g., position and orientation along the roadway or pitch, yaw and roll of the vehicle chassis) of each self-driving vehicle in the group, along with the precise arrangement of acoustical sensors on each vehicle, can be used to triangulate or otherwise identify the actual location in the environment for the origin of the horn honk or other sound. Information from other sensors of the group of vehicles, map data, and other information available to the group of vehicles can be used to narrow down or refine the location of a likely horn honk. Obtained information may be processed locally, for instance in real time by each vehicle, or one or more vehicles of the group (or a centralized remote computer processing system) may coordinate how certain information is processed by some or all of the vehicles.

According to one aspect, a method of operating a vehicle in an autonomous driving mode is provided. The method comprises obtaining, by one or more acoustical sensors of a perception system of the vehicle, audio sensor data, the one or more acoustical sensors being configured to detect sounds in an external environment around the vehicle; receiving, by one or more processors of the vehicle, audio sensor data from one or more other vehicles operating in an autonomous driving mode, the received audio sensor data including direction-of-arrival and timestamp information regarding a detected sound from the external environment; evaluating, by the one or more processors, the obtained audio sensor data and the received audio sensor data based on a location of the vehicle and locations of the one or more other vehicles associated with the timestamp information to identify an estimated location at which a specific sound emanated and a particular object that likely issued the specific sound; and based on a type of the specific sound, the estimated location, and a type of the particular object, the one or more processors controlling operation of the vehicle in the autonomous driving mode.

In one example, the method further comprising using non-acoustical sensor data to identify at least one of the estimated location or the type of the particular object. In this case, the non-acoustical sensor data may be received from the one or more other vehicles. The method may include identifying the type of the specific sound. In this case, the specific sound type may be a horn honk or a siren noise.

Identifying the estimated location may include evaluating the received audio sensor data according to positions of each acoustical sensor of an array of sensors from each of the one or more other vehicles. The evaluating may be further based on a pose of the vehicle and poses of each of the one or more other vehicles.

In another example, the method includes identifying a first likelihood region as the estimated location of the specific sound based on the audio sensor data obtained from the perception system of the vehicle; identifying one or more additional likelihood regions as the estimated location of the specific sound based on the audio sensor data received from each of the one or more other vehicles; and comparing the first likelihood region and the one or more additional likelihood regions to identify a highly localized region as the estimated location of the particular object.

The method may also include determining whether the specific sound relates to operation of the vehicle in the autonomous driving mode. Here, the method may further comprise changing a driving operation of the vehicle in response to determining that the specific sound relates to the operation of the vehicle in the autonomous driving mode. In this case, the method may include using the determination that the specific sound relates to the operation of the vehicle in the autonomous driving mode in a reinforcement learning process.

In yet another example, the method also includes transmitting the obtained audio sensor data to (i) at least one of the one or more other vehicles, or (ii) a back-end server system remote from the vehicle and the one or more other vehicles. Here, the process may include transmitting a set of non-acoustical sensor data to (i) the at least one of the one or more other vehicles, or (ii) to the back-end server system. The method may further comprise selecting the one or more other vehicles based on at least one of a proximity to the vehicle, an estimated proximity to the particular object, a driving condition, or an environmental condition. In this case, the method may also include pre-processing the obtained audio sensor data to perform one or more of noise cancellation, filtering, signal averaging or signal boosting. The pre-processing may include pre-processing multiple samples of the obtained audio sensor data to account for one or more of (i) changes over time in positioning of the one or more acoustical sensors of the perception system of the vehicle, (ii) signal attenuation, or (iii) a Doppler shift caused by relative movement of the particular object and the vehicle.

In another example, receiving the audio sensor data from one or more other vehicles may include one of (i) directly receiving the audio sensor data from the one or more other vehicles, or (ii) indirectly receiving the audio sensor data from a back-end server system. And in a further example, the method also includes evaluating a change in the specific sound over time; and controlling operation of the vehicle in the autonomous driving mode includes adjusting operation of the vehicle in the autonomous driving mode based on the change in the specific sound over time.

According to another aspect of the technology, a method is provided for assisting one or more vehicles operating in an autonomous driving mode. The method comprises receiving, by one or more processors of a server system, audio sensor data from a set of vehicles each operating in an autonomous driving mode, the received audio sensor data having been detected by one or more acoustical sensors of a perception system of each vehicle of the set of vehicles, the received audio sensor data including direction-of-arrival and timestamp information regarding a detected sound from an external environment of each corresponding vehicle; evaluating, by the one or more processors, the received audio sensor data based on locations of the vehicles associated with the timestamp information to identify an estimated location in the external environment at which a specific sound emanated and a particular object that likely issued the specific sound; and transmitting, to the set of vehicles, the estimated location of the specific sound and at least one of a type of the specific sound and a type of the particular object.

In one example, this method also includes identifying a plurality of likelihood regions as the estimated location of the specific sound based on the audio sensor data received from each of the vehicles in the set; and comparing the plurality of likelihood regions to identify a highly localized region as the estimated location of the particular object; wherein transmitting the estimated location comprises transmitting the highly localized region to the set of vehicles. In another example, this method includes determining whether the specific sound relates to operation of a given one of the set of vehicles.

BRIEF DESCRIPTION OF THE DRAWINGS

FIGS. 1C-D illustrate an example cargo-type vehicle configured for use with aspects of the technology.

FIGS. 7A-C illustrate a multi-vehicle noise evaluation scenario in accordance with aspects of the technology.

FIG. 9 illustrates an example method in accordance with aspects of the technology.

DETAILED DESCRIPTION

Having multiple self-driving vehicles in the same area that are able to effectively communicate certain data in real time allows for accurate localization of the three-dimensional (3D) position of a honking horn or other sound. In contrast, when only one acoustical sensor or a single self-driving vehicle receives a sound, it may only be possible to obtain the direction-of-arrival for the sound, or, at best, a very coarse range resolution using a microphone array. This may be insufficient in many instances to accurately identify what vehicle or other object issued the sound, or may otherwise limit the ability of the system to determine the reason for a horn honk and either take corrective action or respond in a beneficial manner.

A self-driving vehicle that is configured to operate in an autonomous driving mode may be part of a fleet of vehicles, or otherwise able to communicate with other nearby self-driving vehicles. Thus, a self-driving vehicle may be in a situation where there are multiple nearby self-driving vehicles in the same area, e.g., within a few blocks of one another, along the same stretch of freeway, within line of sight, less than 100-250 meters away, etc. The likelihood of multiple self-driving vehicles being in the same area at the same time will increase as self-driving vehicles become more prevalent, for instance as part of a taxi-type service or a package delivery service.

By way of example and as explained further below, different self-driving vehicles in a group of nearby vehicles are able to share sensor data from a microphone or other acoustical array with the other nearby vehicles upon a detected honk or other noise. This sensor data could be raw or processed. In the former case, the audio data may not be particularly sizeable (e.g., on the order of tens to hundreds of kilobytes of data) and could be re-transmitted over low-data rate wireless links without significant latency. This could allow for highly granular (including sub-wavelength) range resolution. In the latter case, the processed data may include, for instance, just the direction-of-arrival and timestamp, or other information sufficient for triangulation. This would result in transmitting even fewer bytes of data, which would enable low latency communication at a small onboard processing cost at each vehicle.

Example Vehicle Systems

Figure 1A:
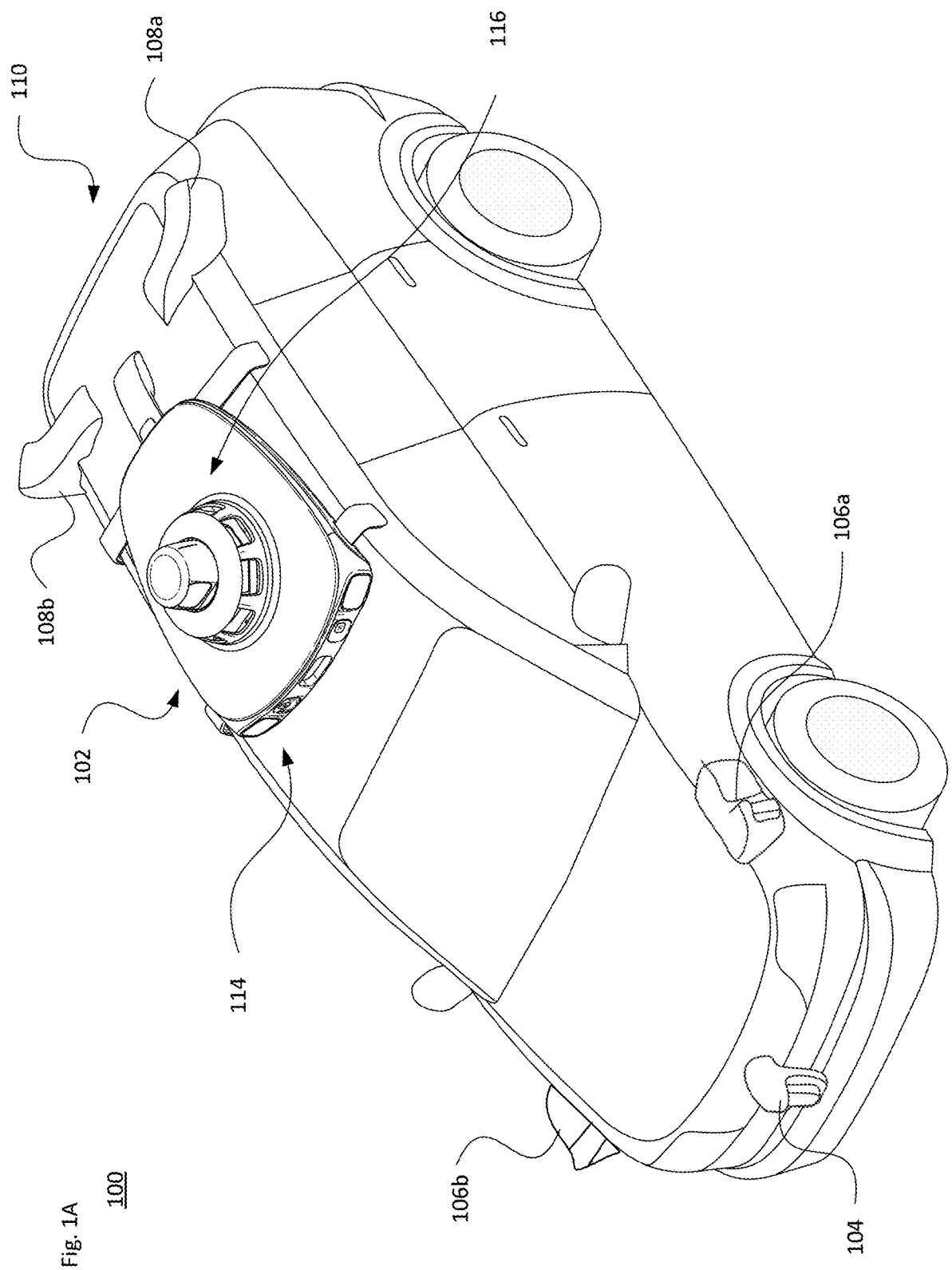
FIGS. 1A-B illustrate example self-driving vehicles in accordance with aspects of the technology.
Figure 1B:
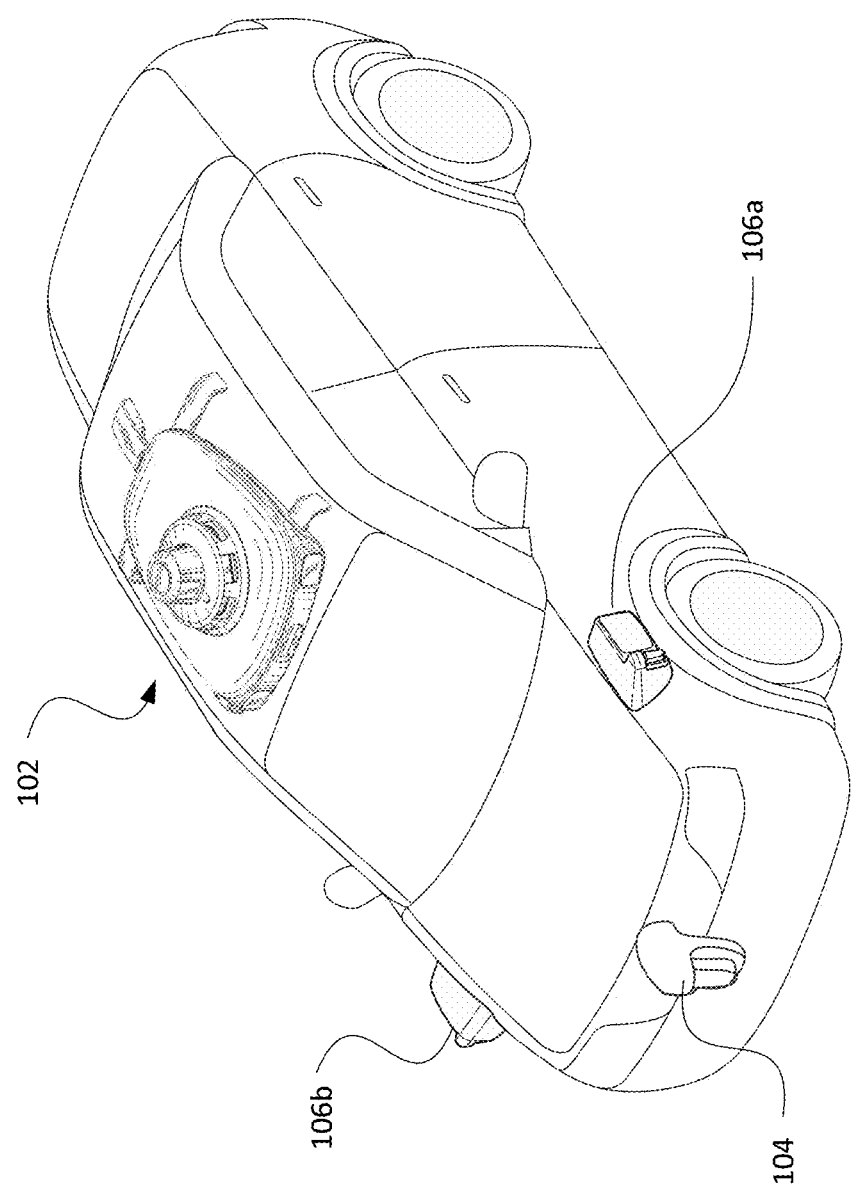

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicle of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
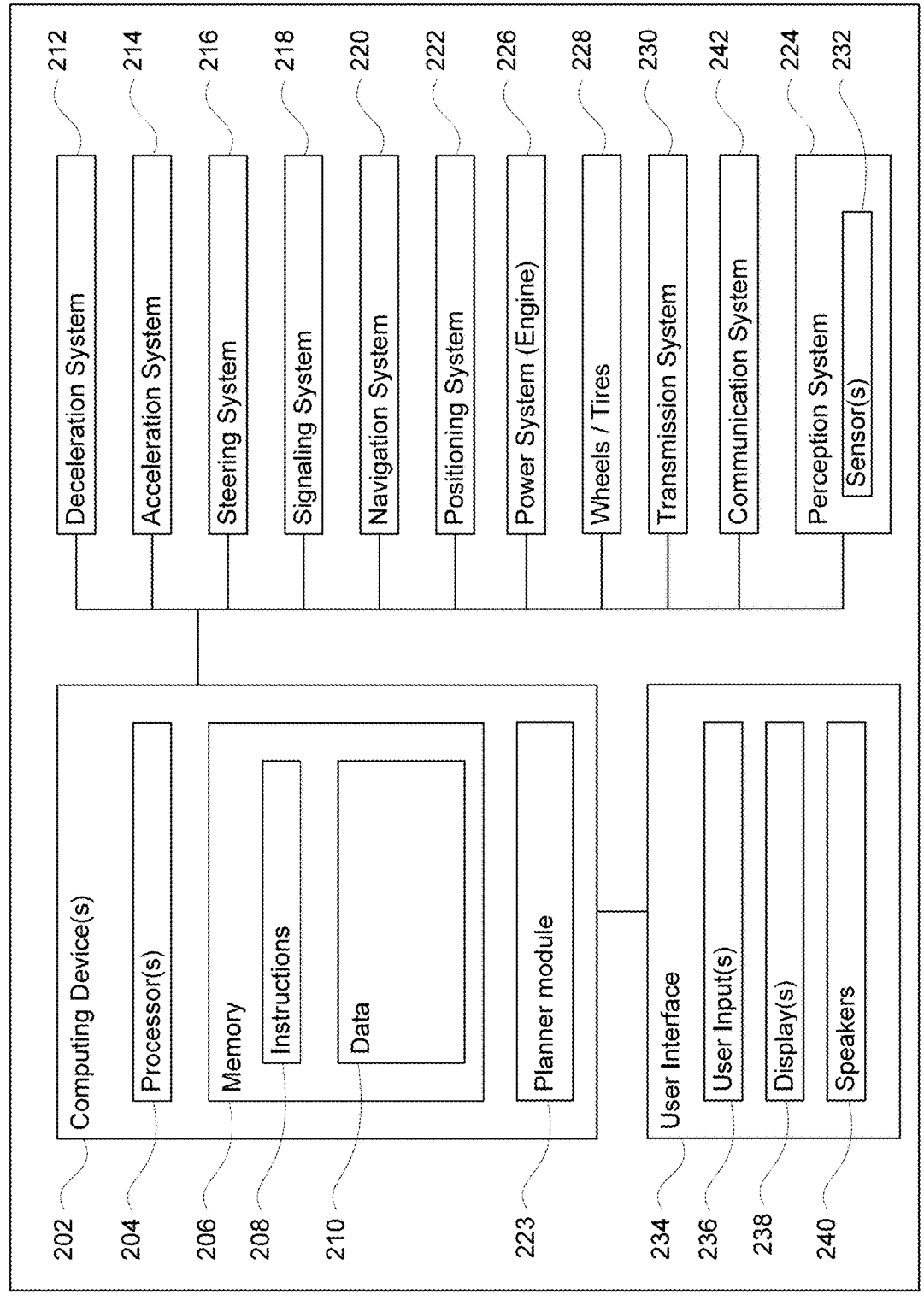
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include acoustic models or the like to perform, e.g., noise cancellation, triangulation, trilateration, vehicle or other object recognition, honk or other sound recognition, etc. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the perception system 224 may include one or more microphones or other acoustical arrays, for instance arranged along the roof pod 102 and/or other sensor assembly housings. The microphones may be capable of detecting sounds across a wide frequency band (e.g., 50 Hz-25 KHz) such as to detect various types of noises, or may be designed to pick up sounds in specific narrow bands (e.g., 300-500 Hz) designed for use with horn honks or other vehicle noises. If such noises are subject to regulation (e.g., SAE J1849 for emergency vehicle sirens), the microphones may be configured to pick up such sounds. In one scenario, the microphones are able to detect sounds across a wide frequency band, and post-processing using one or more acoustic modules may be performed to identify sounds in particular limited frequency bands.

Other exterior sensors may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202.

Such sensors of the perception system 224 may detect objects outside of the vehicle and their characteristics such as location, orientation relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform validation or calibration of individual sensors, all sensors in a particular sensor assembly, or between sensors in different sensor assemblies or other physical housings. In some instances, validation or calibration may occur between acoustical sensors across multiple vehicles. For instance, information obtained by acoustical sensors of one self-driving vehicle could be used to validate (or calibrate) the acoustical sensors of another self-driving vehicle. By way of example, it would be possible to honk the horn of one of the vehicles (in various locations as it drives around). Detection of the honks by other vehicles may be used in the validation of the sensors of the other vehicles. Alternatively or additionally, one could place a speaker on the vehicle and play various siren sounds in a similar manner. As long as the system knows the ground-truth position of the emitter on one vehicle, that can be used to validate or calibrate the other vehicle(s) acoustical sensors. Driving around (and playing various types of sounds) helps ensure a diverse set of data for calibration and validation.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
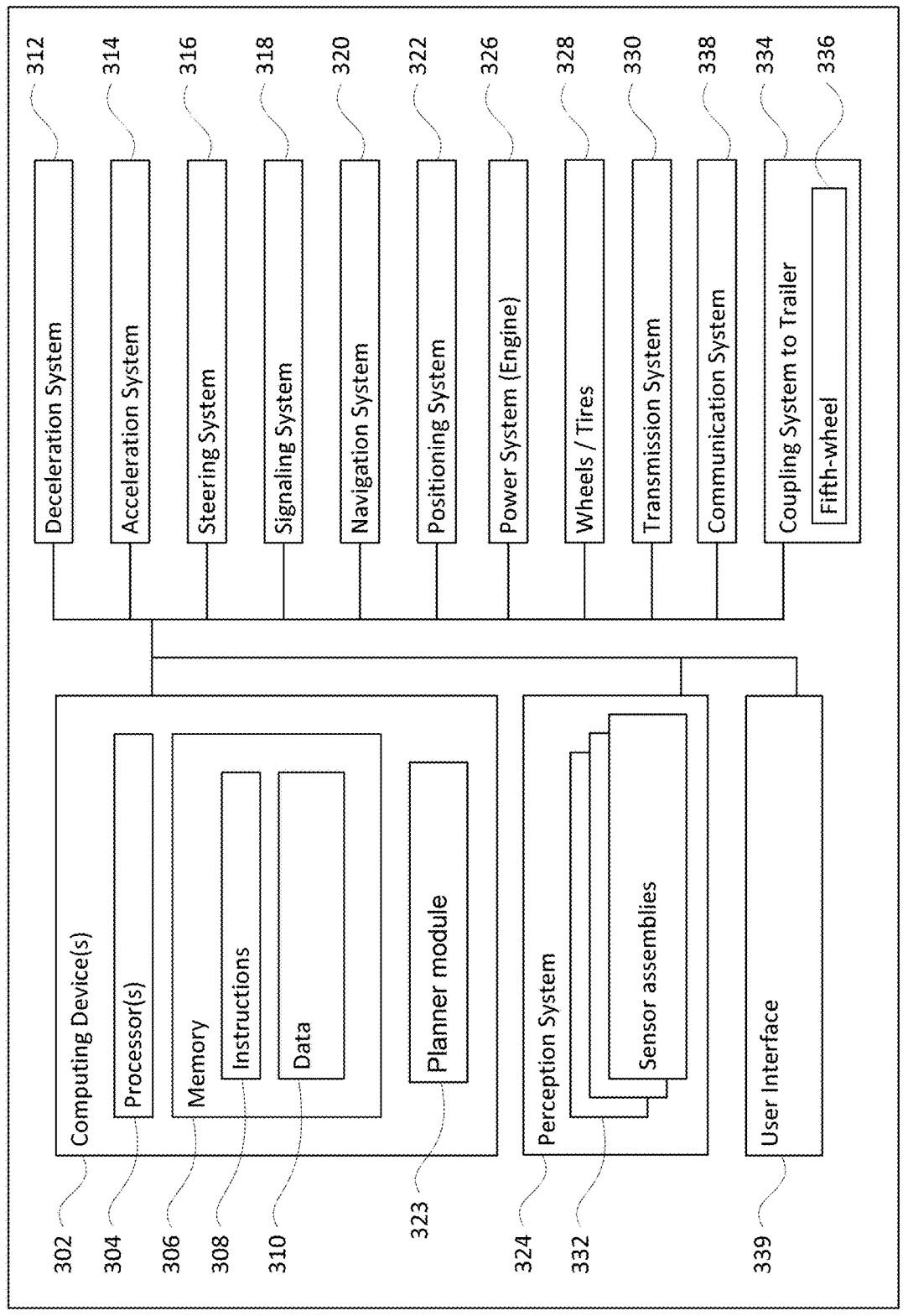
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the memory may include acoustic models to perform, e.g., noise cancellation, triangulation, trilateration, vehicle or other object recognition, honk or other sound recognition, etc.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
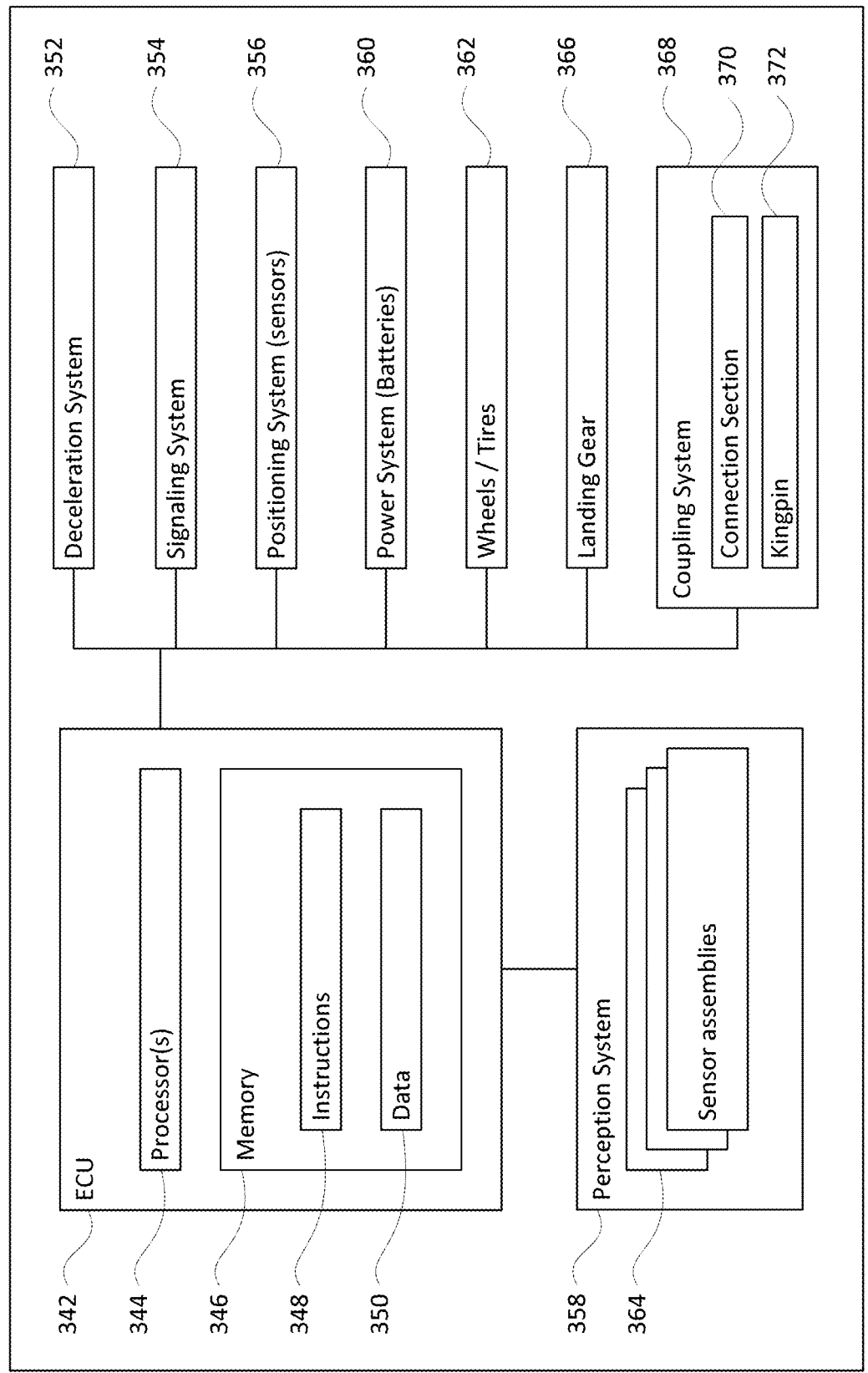

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

FIGS. 4A-G illustrate one example of a roof pod assembly 300 such as shown in FIGS. 1A-B. As noted above, the roof pod assembly may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). In the illustrated example, the roof pod assembly 400 includes a base section 402 arranged closer to the roof of the vehicle and an upper section 404 sitting above the base section and remote from the vehicle roof. Each of these sections may include various sensor suites of the types described above, local processing systems (e.g., to process raw data from the sensors) and other equipment such as wipers or other cleaning systems to clean the various sensors. By way of example only, the front side 406 of the base section 402 may include image sensors (e.g., optical cameras) and/or radar sensors arranged to detect objects in front of the vehicle as it drives in an autonomous mode.

The elevated upper section 404 may include different types of sensors arranged in different tiers or configurations, such as part of a dome-type or layer-cake type arrangement. By way of example, a series of image sensors (e.g., optical cameras) may be arranged in a circular or other configuration in a first part 408 of the upper section, such as to provide overlapping fields of view around the vehicle. And a second part 410 of the upper section may include one or more lidar units or other sensors, which may be configured to rotate 360° or to otherwise provide a full field of view around the vehicle. In this example, the first part 408 is mounted on an upper surface of the base section 402, and the second part 410 is disposed on top of the first part 308.

As seen in FIGS. 4A-G, the roof pod assembly 400 also includes a pair of legs or other support members 412. The support members 412 are affixed to a bottom surface of the base section 402, and are configured to connect along the left and right sides of the roof of the vehicle, for instance as illustrated in FIGS. 1A and 1B. The support members 412 are arranged so that the bottom surface of the base section 402 does not rest on or directly contact the vehicle roof. The roof pod assembly 300 may further include a conduit member 414, so that power, data and/or fluid conduits may be run between the vehicle and the roof pod assembly 400. The front support member 412 may be affixed adjacent or along the left/right A pillars of the vehicle frame, while the rear support member 412 may be affixed adjacent or along the left/right C (or D) pillars of the vehicle frame.

Elevating the roof pod assembly above the vehicle's roof allows for certain features to be incorporated into the bottom of the assembly. For instance, one or more water drains (not shown) can be included along the bottom, e.g., adjacent to the support members. One or more air intake vents (not shown) can also be provided, for instance to use as part of an active or passive cooling system for the roof pod assembly.

Figure 4A:
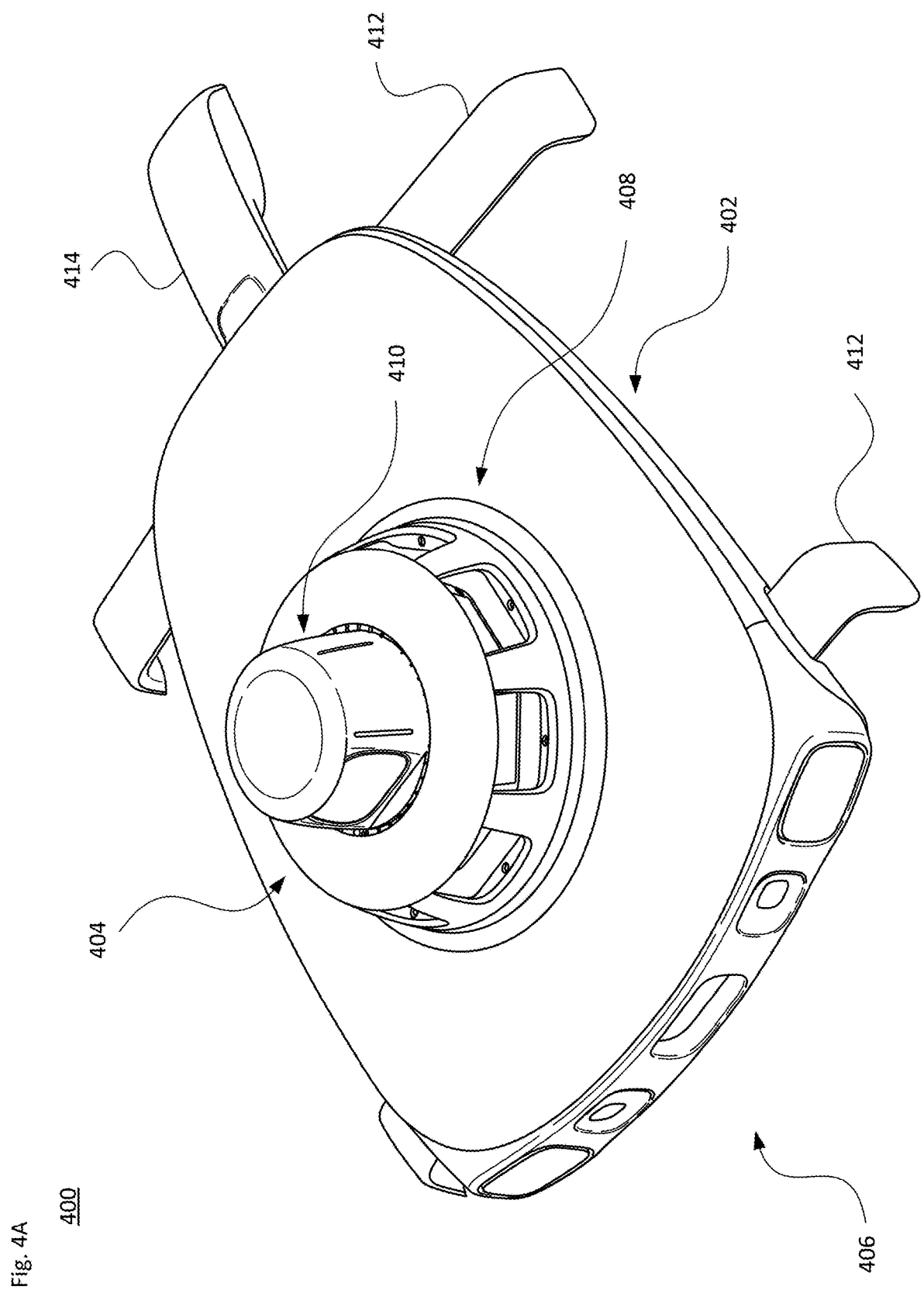
FIGS. 4A-G illustrate views of an elevated roof sensor assembly in accordance with aspects of the technology.
Figure 4B:
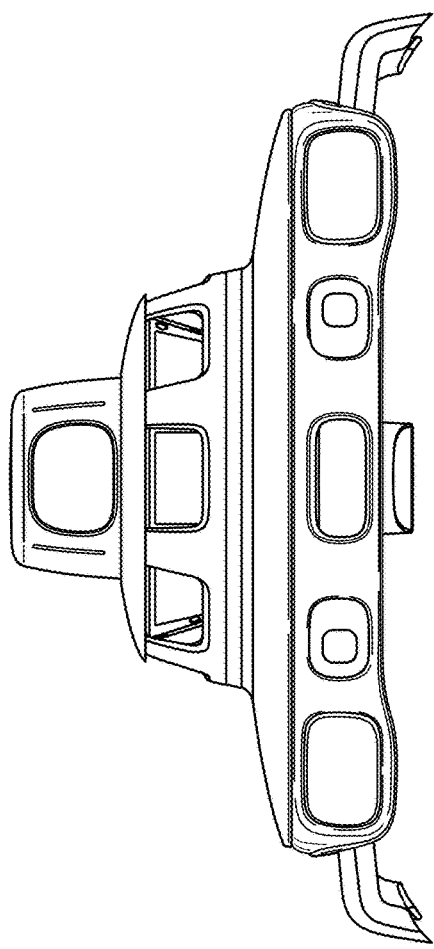
Figure 4C:
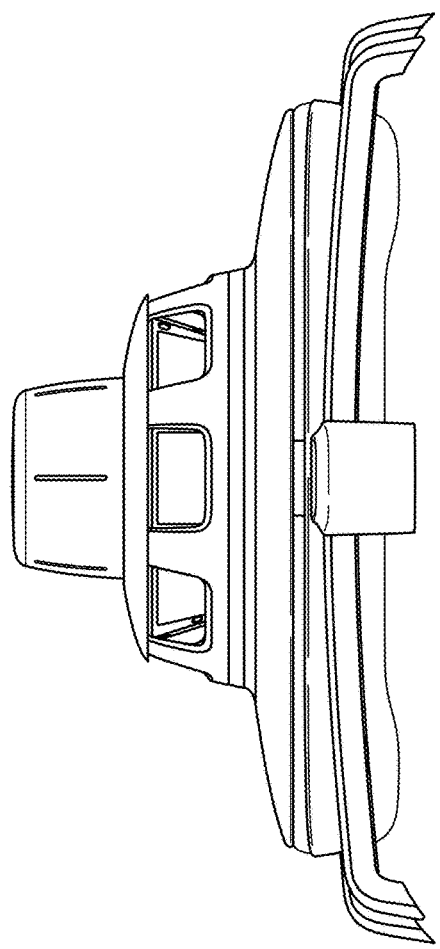
Figure 4D:
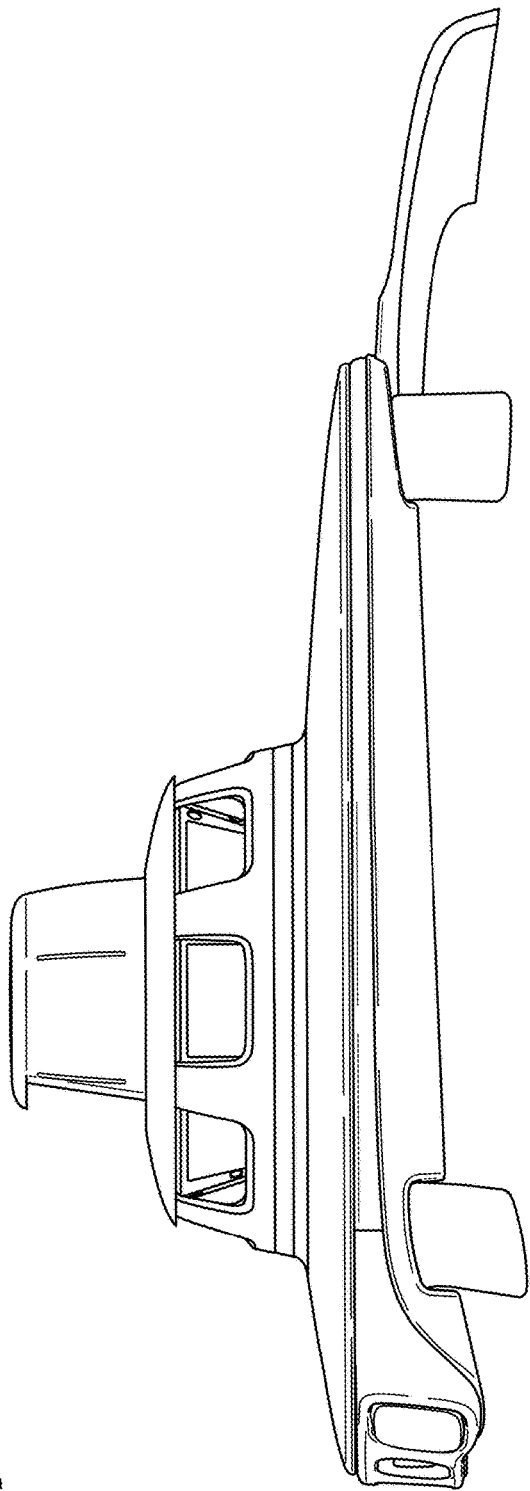
Figure 4E:
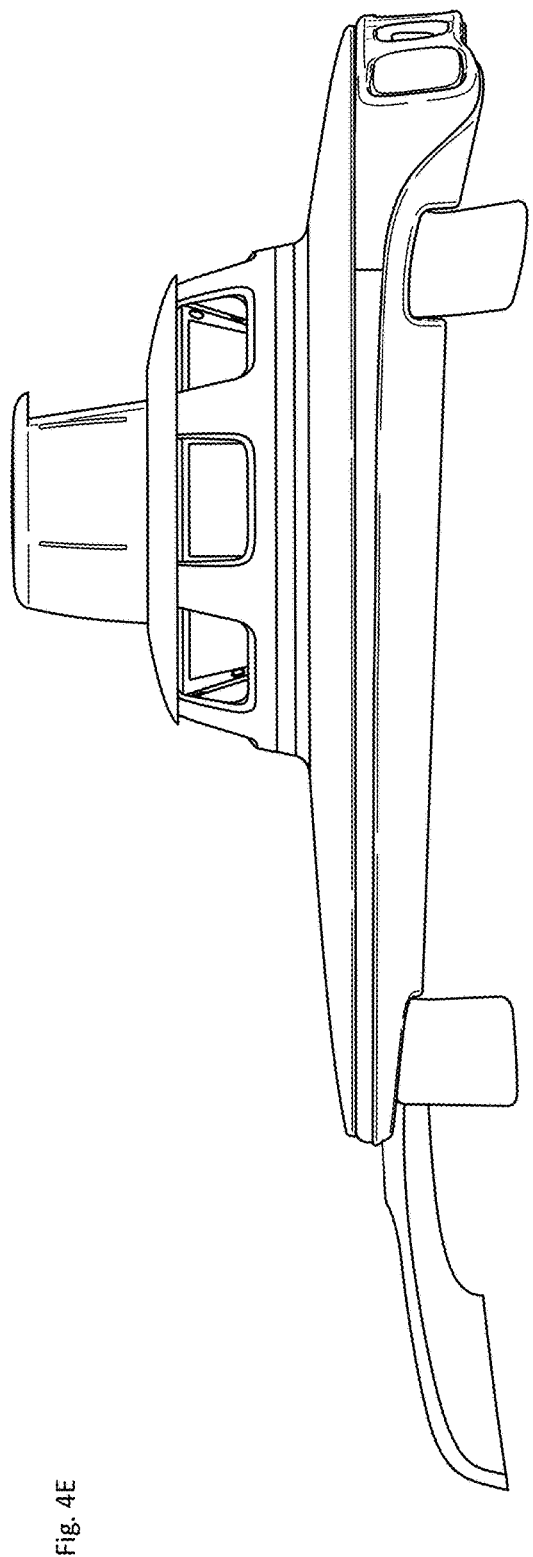
Figure 4F:
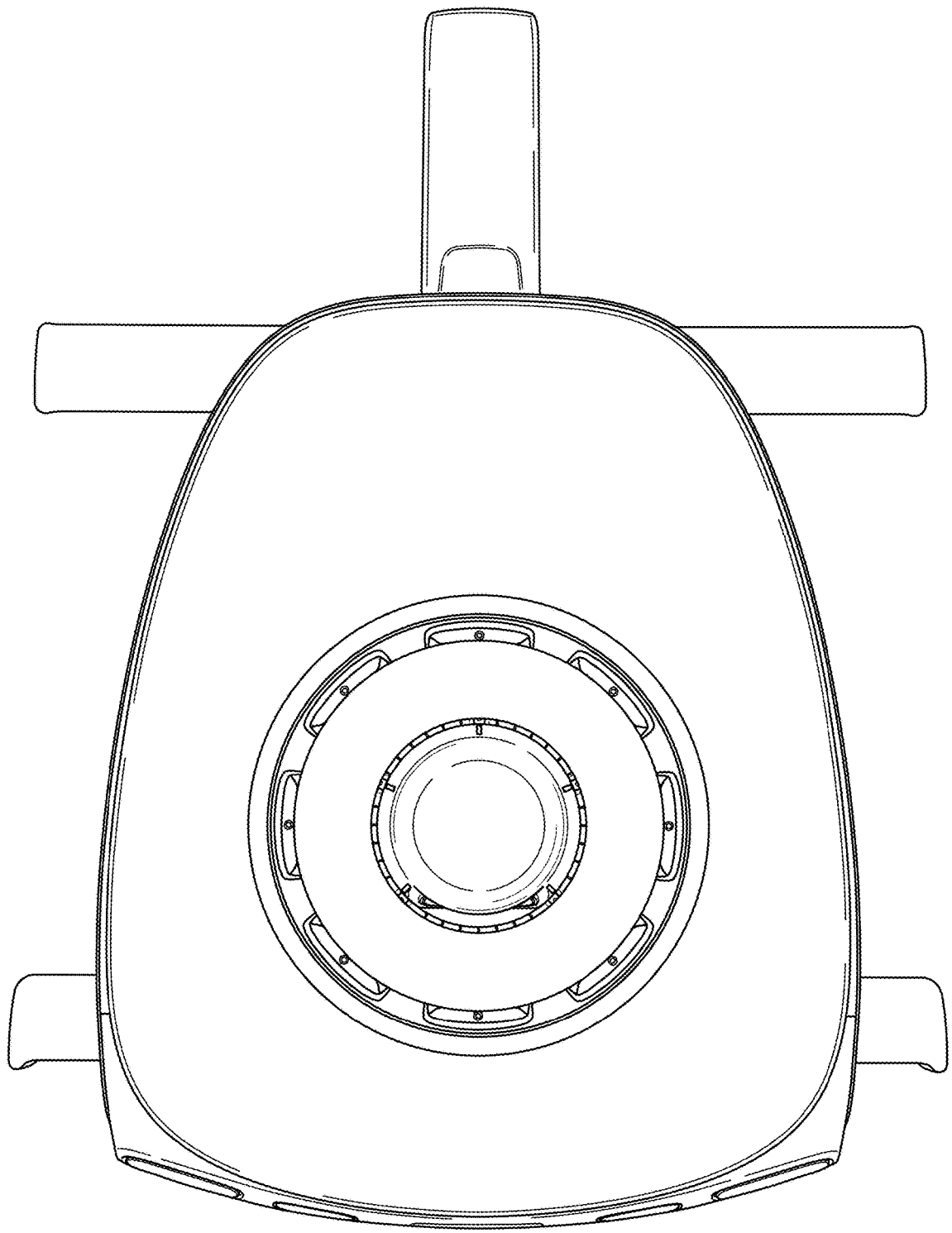
Figure 4G:
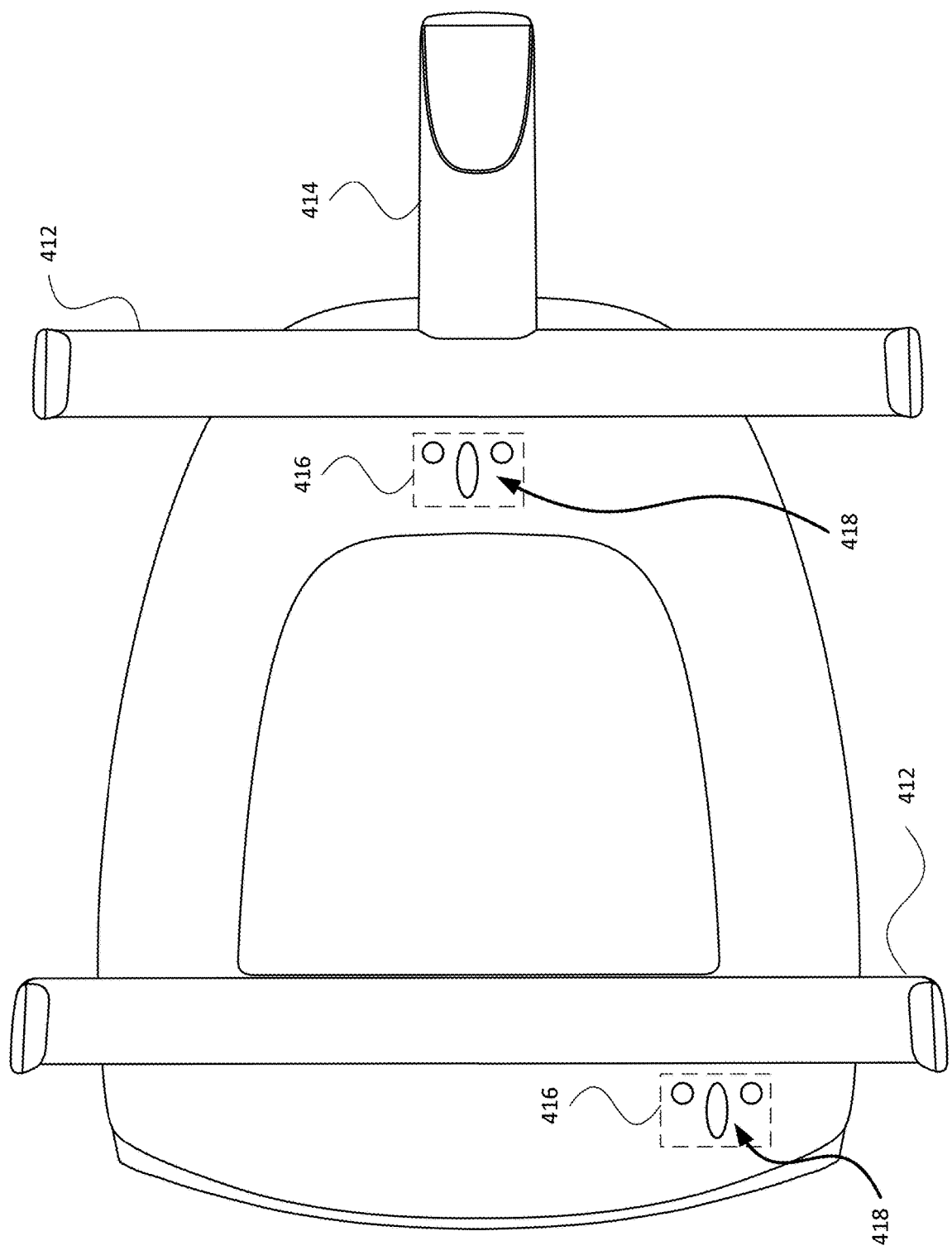

Illustrated in FIG. 4G are dashed lines with exemplary locations 416 for receptacles where microphones or other acoustical transducers 418 may be disposed. The transducers may be passive, directional transducers that only receive sounds. While only two locations 416 are illustrated, in one example at least three distributed locations are employed in an acoustical system, which may be aligned on a plane such as the bottom surface of the roof pod assembly, oriented in different directions around the vehicle, etc. The integration of such an acoustical system into the roof pod assembly in this manner allows for triangulation, trilateration and/or other means to determine the location of a horn honk or other sound source.

For instance, the timing, frequency(ies), harmonics, pitch change and/or amplitude, etc. of a horn honk or other noise reaching each of the microphones 418 in an acoustical array may be measured and used provide measurements as to a likely bearing, or relative direction, of the source of the sound, with respect to a given self-driving vehicle. This could be used to generate a probability distribution over possible bearings for the sound source relative to that particular self-driving vehicle. By way of example, this could include computing a measure of uncertainty about location (such as a covariance ellipse or a distribution of possible locations).

As seen by the oval and circular indicators in the exemplary locations 416 of FIG. 4G, more than one microphone or other acoustical transducer may be co-located at the same place along the roof pod assembly or other sensor housing. The co-located transducers may be used for noise cancellation or signal averaging, which may be performed locally at the sensor array, by a process of the sensor assembly (e.g., the roof pod assembly), by a control system of the vehicle (e.g., computing device 202 or 302), or by a remote backend system. In one scenario, the spacing of the co-located transducers may be selected based on expected wavelengths of horn honk, siren noises or other sounds for an expected area of operation (for instance, different countries may use different horn honks or siren noises) to avoid spatial aliasing or ambiguity. By way of example, the microphones may be located approximately ½ wavelength apart from one another, in order to be able to compute direction from the relative phase of the sound waves that reach each microphone or rather the time difference of arrival.

Figure 5A:
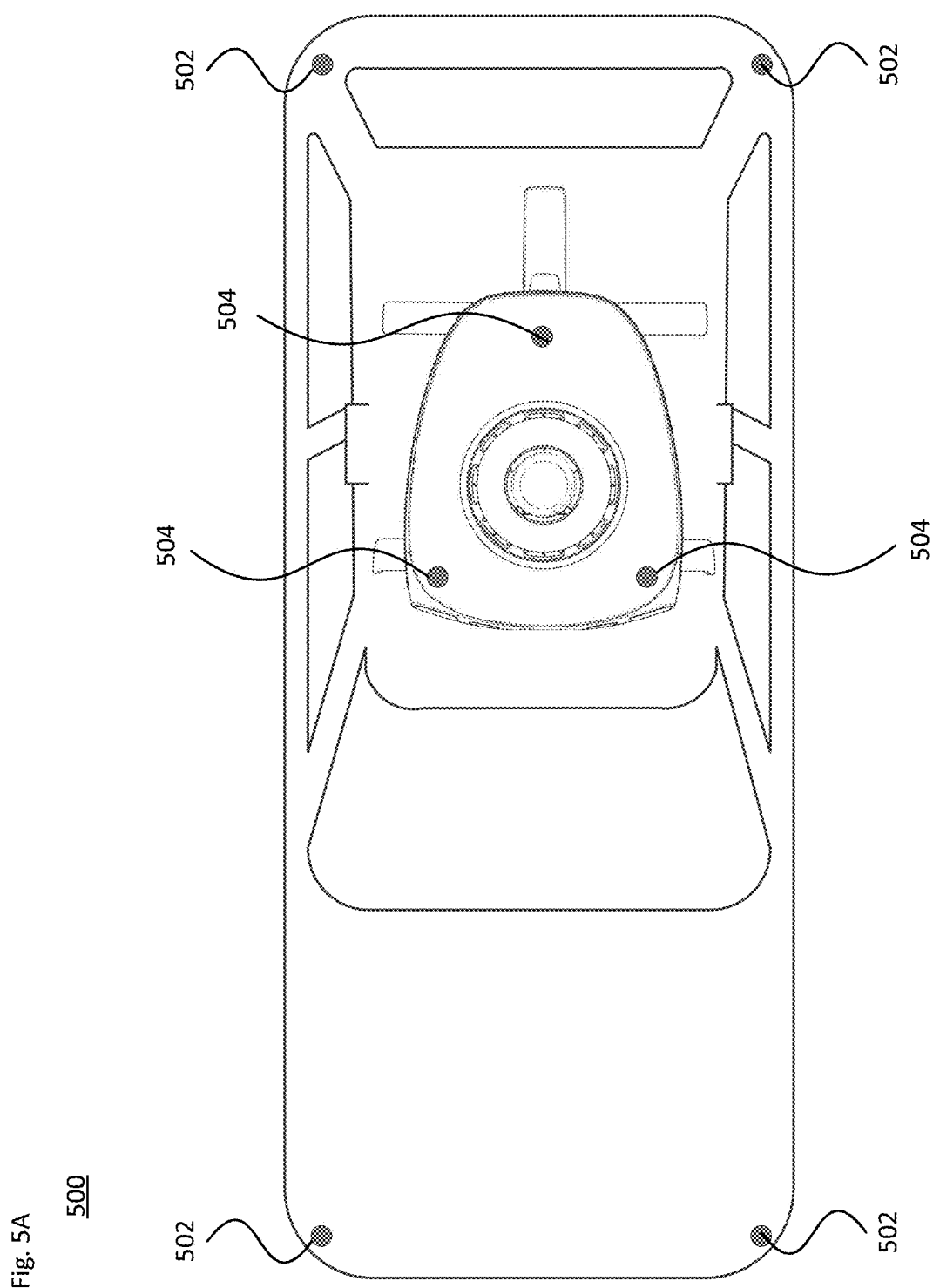
FIGS. 5A-B illustrate exemplary microphone sensor arrangements in accordance with aspects of the technology.
Figure 5B:
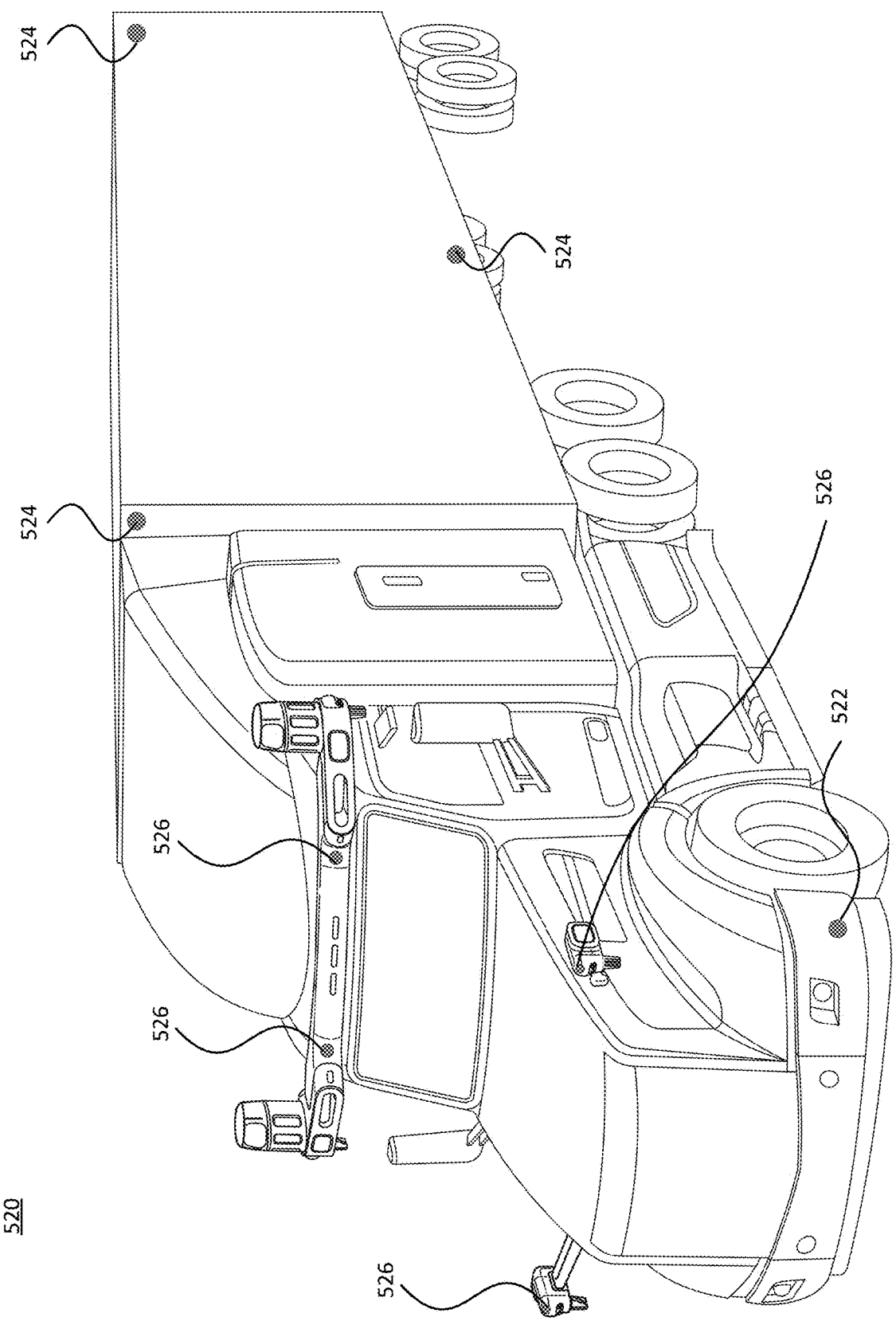

While FIG. 4G illustrates two sets of microphones arranged in an arrangement along the bottom of the base of the roof pod assembly, other microphone locations are possible. For instance, as seen in the top-down view 500 of FIG. 5A, one or more microphones may be located at positions 502 arranged on the chassis of the vehicle, such as along the front or rear bumpers, while other microphones may be located at positions 504 arranged on the roof pod assembly or other sensor suite extending away from or otherwise not part of the vehicle chassis. And FIG. 5B illustrates a perspective view 520 of a truck. Here, one or more microphones may be located at positions 522 arranged on the chassis of the cab of the truck, one or more microphones may be located at positions 524 arranged along the trailer, and one or more microphones may be located at positions 526 arranged on an elongated assembly above the cab or other sensor suite extending away from or otherwise not part of the tractor or trailer chassis. These positions and arrangements are merely exemplary. Different locations along the vehicle or extending from the chassis as part of a sensor assembly may also be employed. The various locations used to create a sensor array around the self-driving vehicle may be selected based on the directionality of the microphones, to minimize sensor occlusion or the impact of wind, and/or other factors.

The locations of each acoustical sensor in the array arranged about the vehicle is known. Such information can include the relative 3D position and facing direction of each microphone using a common coordinate system associated with the vehicle. Because on-board sensors (e.g., GPS sensors) are used to determine the location of the vehicle in a driving environment, such sensors can be used to obtain pose and other information about the vehicle itself, such as an accurate trailer position relative to the tractor for a large articulated commercial vehicle. This can include orientation information about the state of different sections of the vehicle (e.g., tractor or trailer) in terms of position, roll, pitch, yaw, and associated time derivatives of such state information. Any or all of this information may be used as part of a kinematic or dynamic model of the vehicle, and can be evaluated in conjunction with highly detailed map information, such as an elevation map, road graph or other data set showing the roadway and fixed objects such as buildings, trees, street signs, etc.

This information allows the vehicle to determine not only where it is along the roadway and its current positioning, but the specific position of each acoustical sensor relative to one another and relative to the external environment at a given point in time. The system is able to utilize this information to identify a likely direction of a horn honk or other sound. As noted above, this may involve computing a measure of uncertainty about location (such as a covariance ellipse or a distribution of possible locations. For instance, according to one aspect, the microphones in the distributed locations along the vehicle may be time synchronized in order to provide an estimated bearing of the source or what direction the siren is coming from relative to that vehicle. In particular, a time difference of arrival (TDOA) or similar technique may be employed, such as to localize a given sound on a hyperboloid. It is important to note that the error in localizing a honk or other emitted sound is much higher for an array of nearly co-located sensors (which may be, e.g., distributed across an area on the order of 1-4 square meters), while the error from multiple self-driving vehicles would be much lower because the macro-array formed from the individual arrays from different vehicles is significantly more spread out (e.g., tens or hundreds of square meters or more). Also, for periodic signals like sirens, there may be multiple solutions (e.g., multiple potential hyperboloids), and so reducing localization error via this multi-vehicle method to be smaller than the distance between those hyperboloids is important for arriving at a unique solution.

Figure 6A:
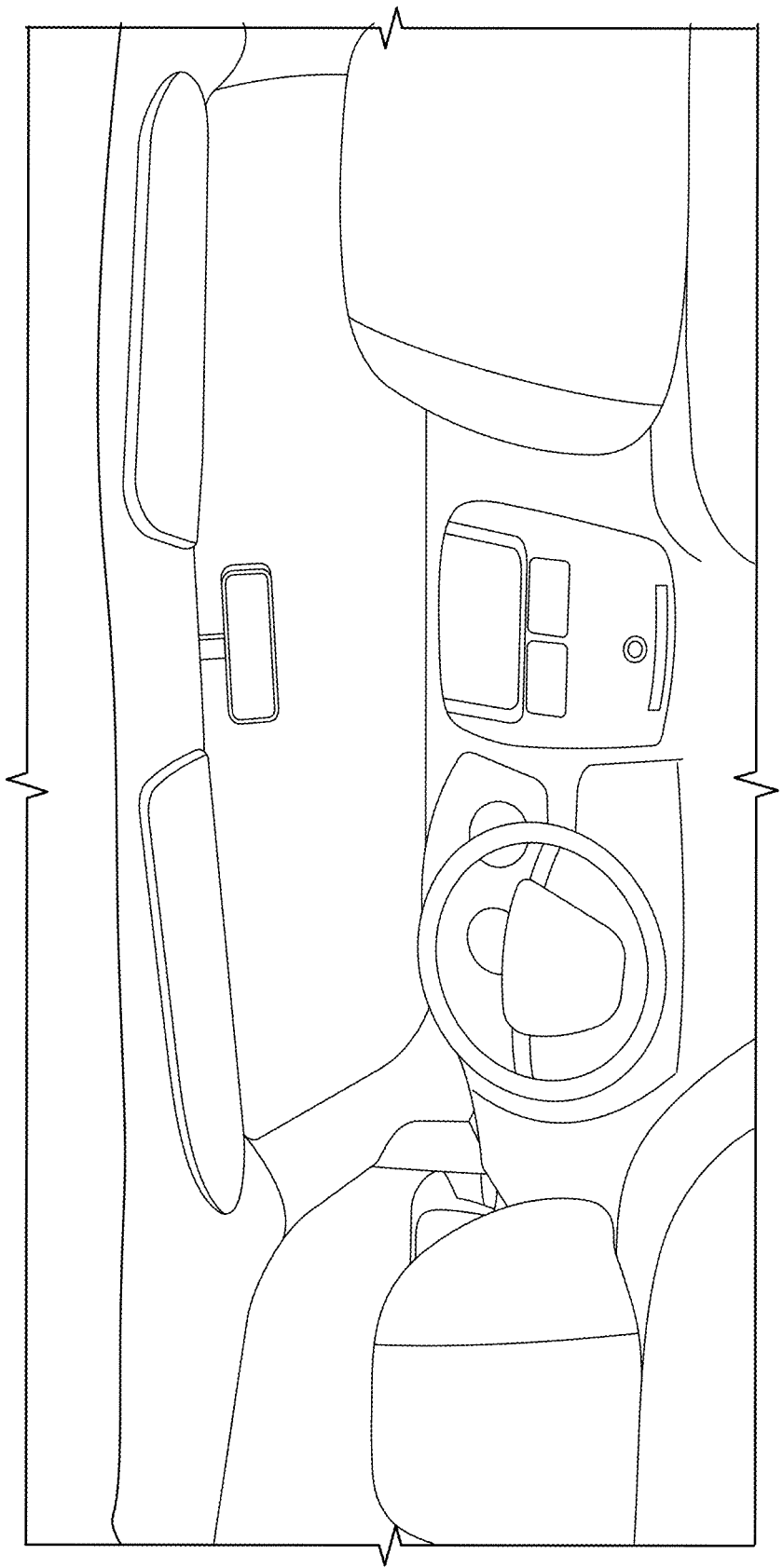
FIGS. 6A-B illustrate an in-vehicle scenario in accordance with aspects of the technology.
Figure 6B:
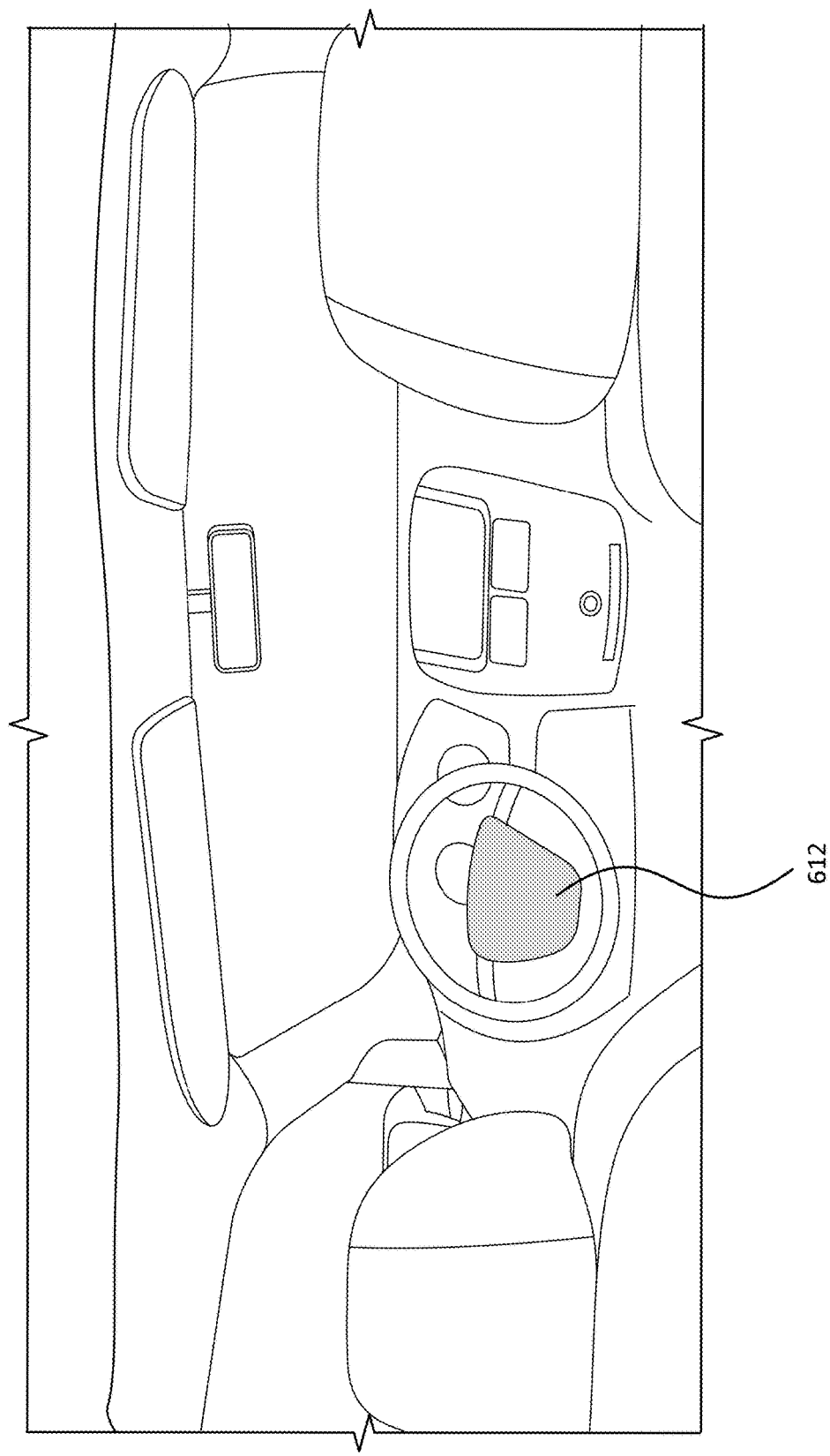

FIGS. 6A-B illustrate one example horn honk scenario. In particular, FIG. 6A illustrates a first view 600 of the interior of a vehicle, which may be driven in a manual driving mode. FIG. 6B illustrates a second view 610, in which a portion 612 of the steering wheel has been pressed in order to honk the horn. For instance, the driver of the vehicle may give a single short press (e.g., less than 0.25-0.5 seconds) or a series of short presses to indicate its presence to another vehicle. A longer press (e.g., 0.5-2.0 seconds) may be used to warn the other vehicle about a possible problematic condition, such as backing up or turning with an obstructed field of view. And a series of very long presses (e.g., 2-4 seconds) may be used to indicate a potentially dangerous situation, such as an animal or other object in the roadway. Other situations could occur with siren noises, screeching tires, a collision, shouting, the sound of air brakes releasing (e.g., indicating that a bus has stopped to pick up passengers) or other sounds, which might emanate from a vehicle or other object, which may or may not be stationary. For instance, a firehouse alarm, railroad crossing bell, or lightening detector alarm may provide an indication of a situation associated with a particular location, rather than a moving vehicle.

Figure 7A:
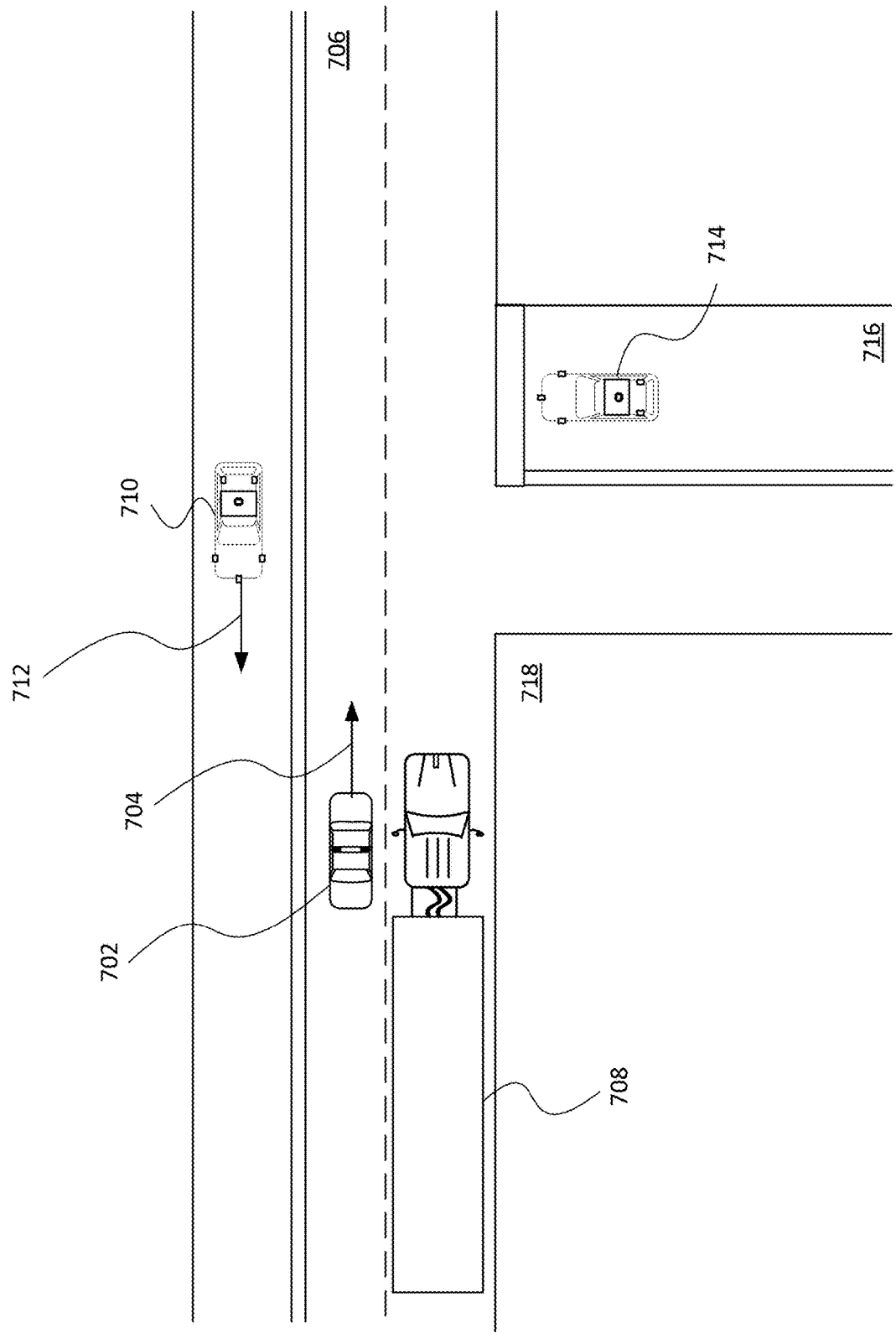
Figure 7B:
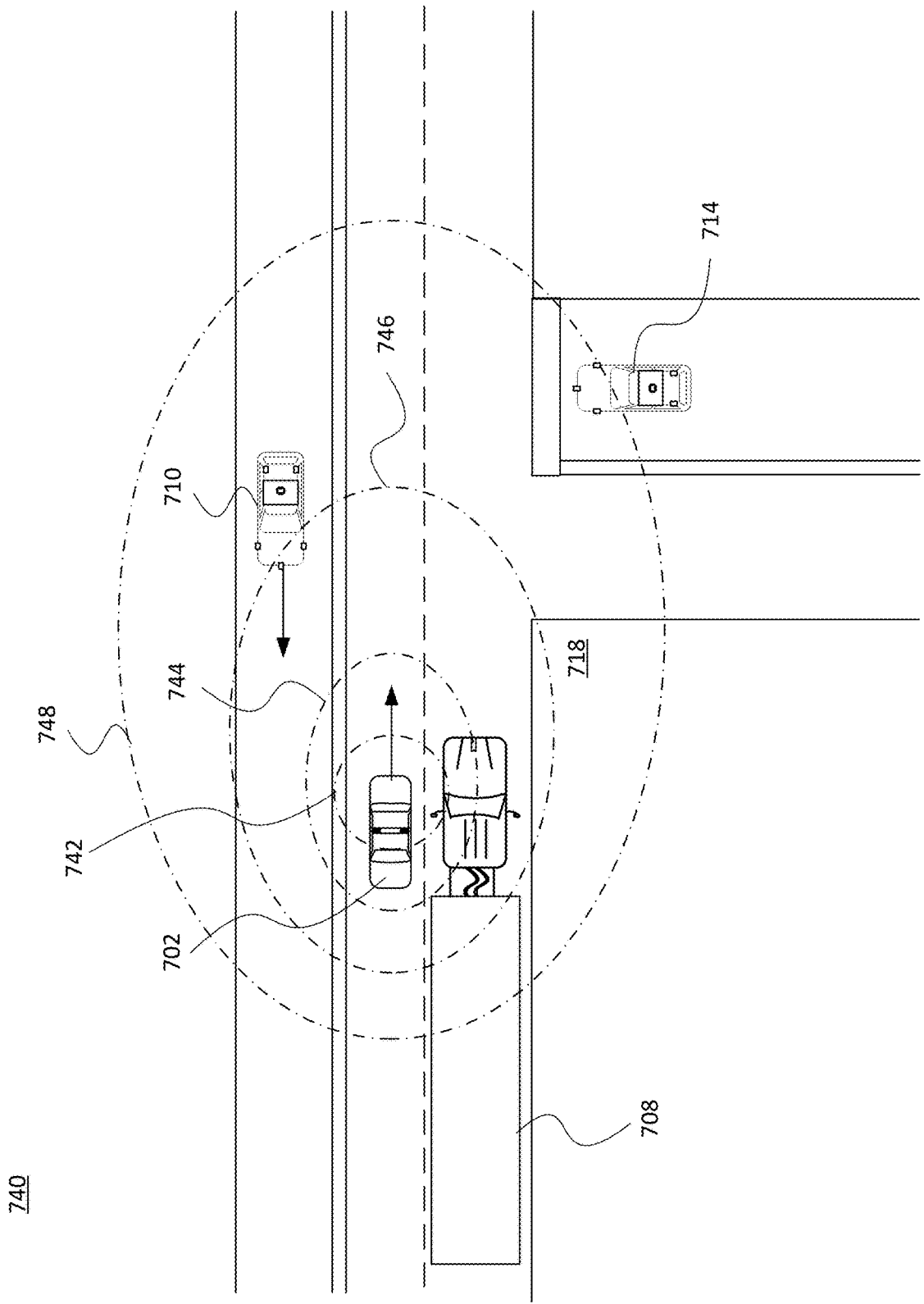

FIGS. 7A-C illustrate one scenario illustrating how a number of self-driving vehicles can be employed to accurately locate the source of a horn honk or other sound. As shown in view 700 of FIG. 7A, vehicle 702 is driving in a first direction 704 along a first roadway segment 706. Traveling in the same direction in an adjacent lane is a self-driving truck 708. A self-driving sedan 710 is traveling in a second, opposing direction 712 along the first roadway segment. Another self-driving vehicle 714 is stopped at an intersection along a second roadway segment 716. In this example, a tall building 718 (e.g., 3 stories or higher) may be on the opposite side of the second roadway segment 716 and adjacent to the truck 708.

When vehicle 702 honks its horn, as seen in view 740 of FIG. 7B, the sound may propagate away from the vehicle 702, as shown by the dash-dot elliptical rings 742, 744, 746 and 748. Given the relative location, pose, speed of travel and other factors, the microphones arranged along each self-driving vehicle (e.g., vehicles 708, 710 and 714) may detect the emitted honk at different times and/or at amplitudes, and with different Doppler shifts. In addition, objects such as the tall building 718 may either block some of the sound from reaching the vehicle 714, or the sound may reflect off of the objects and create echoes. Furthermore, there may be other environmental noise nearby the honking vehicle and/or the self-driving vehicles.

All of this may affect the ability of a single self-driving vehicle from accurately identifying the location of the honking vehicle. By way of example, each vehicle 708, 710 and 714 may generate a respective range, directional vector, probability distribution or other estimate for the location of the honking vehicle. As shown in view 780 of FIG. 7C, vehicle 708 may generate a likelihood region 782, vehicle 710 may generate a likelihood region 784, and vehicle 714 may generate a likelihood region 786. By sharing information between these vehicles, a highly localized region 788 may be determined. In one example, the highly localized region may be on the order of 0.5-3.0 meters in width, length and/or height. In another example, the highly localized region may be a specific portion of a roadway segment.

Information about the localized region by itself may be sufficient to identify the horn honker or noise emitter. However, data obtained by other sensors of the self-driving vehicles can be used to further refine the localized region, for instance to exclude certain possible objects as being the noise emitter and/or to identify one or more objects as likely emitters of the noise. By way of example, if there is a bicyclist or motorcyclist in a lane immediately adjacent to the vehicle 702, the localized region might be large enough to encompass such other objects. But using the detected frequency(ies) of the noise and identification of the types of objects (e.g., car versus motorcycle versus bicyclist) from, e.g., lidar or image sensors, the bicyclist or motorcyclist could be excluded as not being able to produce the detected sound. Object identification may be performed as a separate, concurrent process by the onboard computing device(s), in conjunction with identification of the noise emitter. By way of example, each vehicle may maintain a database or other record of different types of objects (e.g., sedan, truck, motorcycle, moped, bicycle, emergency vehicle, construction vehicle, farm equipment, pedestrian, etc.), sound types of interest (horn honk, siren, backup signal, car alarm, shout, etc.), frequency(ies) of the sound types, etc. It may be of particular importance to include information about different types of emergency vehicles (e.g., ambulance, fire truck, police car, etc.), since such vehicle types can be especially important to detect, so that the self-driving vehicle can take corrective action as needed (e.g., to pull over, slow down, change lanes or the like). In addition, there can be some appearance information in camera images, but not enough to definitively determine (at least at long ranges, e.g., beyond 100-200 meters) with certainty if a vehicle is an emergency or not and whether it has its siren or lights on or not.

In addition to acoustical (and other information), a given vehicle's onboard lidar sensor(s) can be used to detect an occluding object or surface between the hypothesized direct-path between the acoustical sensors and the object creating the sound. In this case, the vehicle could use obtained lidar information to omit certain measurements associated with the occluding object or surface from the sound localization process. In addition, the culling of indirect-path measurements may be enhanced using information from multiple vehicles. By way of example, the system can use outlier rejection methods (such as random sample consensus (RANSAC)) or multi-hypothesis methods (such as a particle filter) to omit indirect path measurements from the sound localization process.

In one scenario, each self-driving vehicle would share sensor data from its microphone array(s) with one or more other nearby self-driving vehicles upon a detected honk or other sound, such as a siren, a road user shouting, etc. If the sound changes (e.g., repeats one or more time, attenuates or gets louder) over a certain timeframe (e.g., 2-10 seconds), that information could also be communicated to the other vehicles. Different approaches could be used so that one self-driving vehicle knows what other self-driving vehicles are nearby. For instance, each self-driving vehicle could continually or intermittently poll for other vehicles through discovery according to a peer-to-peer communication system, such as every 10-30 seconds, every few minutes, or when a certain distance (e.g., 1-5 blocks or 1-2 miles) is traveled. Alternatively, a back-end fleet management system could provide current (or predicted) vehicle location information on a continuous or intermittent basis. In addition, one vehicle could visually identify another of self-driving vehicle (including but not limited to reading its license plate and comparing to an onboard database).

According to one aspect, the onboard system for a given self-driving vehicle may "listen" for one or more types of sounds, such as any sound maintained in its database of sounds. Recognition that a particular type of sound has occurred may involve evaluating a sound segment of a certain duration (e.g., 10-500 ms, at least 50 ms, no more than 2 seconds, etc.). The evaluation may include comparing one or more characteristics of the sound, such as frequency band(s), pitch, amplitude, etc., (as well as changes in these over time, such as when a sirens exhibits a linear frequency ramp ("chirp"), against information stored against a database of sound types (e.g., a database maintained in data 210 of FIG. 2 or data 310 of FIG. 3). Upon determining that a specific type of sound (e.g., horn honk, siren, shout, etc.) has occurred, the onboard system may estimate the direction and distance to the source of the noise. Here, if the estimation determines within some threshold certainty (e.g., 95-99% certainty) that a particular object has made the noise, then the onboard system may not share the information with or request assistance from other self-driving vehicles. However, if the estimation is below the threshold certainty (or even if the threshold is met), the onboard system may share its sensor data with one or more nearby self-driving vehicles. This can be done to refine the location of the noise source, to use as an independent evaluation by another vehicle, to share useful information with other vehicles, for calibration or validation purposes, etc.

The shared sensor data could be raw, because the audio data is not particularly sizeable (e.g., on the order of tens or hundreds of kilobytes) and could be re-transmitted over low-data rate link without significant latency. Alternatively, the sensor data could be at least partially processed by the vehicle that obtains it. This may involve pre-processing the data to filter out ambient noise, boost part of the sound signal, perform signal averaging, or the like. The processing may also involve determining whether the signal is repetitive or evaluating how it changes over time, such as due to the Doppler effect as the sound source and/or the self-driving vehicle(s) are moving relative to one another.

In one example, processed data including at least the direction-of-arrival and timestamp could be transmitted from the obtaining vehicle to other nearby self-driving vehicles. This can be sufficient for triangulation, and would require significantly fewer bits to transmit, which could result in overall lower latency. In another example, the direction-of-arrival and timestamp could be accompanied by the frequency band(s), pitch or Doppler shift information, amplitude, harmonics, information indicating duration and/or repetition of the sound, either for each individual microphone or combined or otherwise pre-processed for the entire array. The pitch or Doppler information may identify the speed (and possibly the direction) of the self-driving vehicle, so that this can be accounted for in the acoustical analysis. To complement this data, information from other vehicle sensors, or other data from the particular self-driving vehicle could be shared with its neighboring self-driving vehicles. By way of example, a unique or random reference number may be assigned to a particular sound, or the timestamp may be used as the sound identifier. Pose or vehicle model data may be relevant when evaluating the relative positions of the different microphones to one another, and so information regarding this may be used in pre-processing or communicated to the other vehicles. In addition, processed data from other sensors (such as the unoccluded field of view according to a lidar sensor) and possibly a priori map data (for instance, that provides topographical information such as hills, etc.) may also be factored in and/or shared with other vehicles. Further, other sensor or vehicle related information, e.g., microphone array intrinsic parameters such as the sensitivity, antenna pattern with respect to the sensor placement along the vehicle, etc., may also be factored in and/or communicated to other vehicles.

A cellular data link of 16-128 kbps could be used to share audio-related (and other) data among the self-driving vehicles, although network latency could cause small delays (e.g., tens of milliseconds) that may impact real-time sound location identification. Alternatively, short range ad hoc RF or optical data links could be used for nearby vehicles. In one example, 900 MHz, 2.4 GHz or 5.7 GHz ISM frequency bands or other permissible bands could be used for RF communication in a non-line of sight or multi-block radius. In another example, onboard optical devices (e.g., lidar sensors) could be used for line of sight optical communication. Regardless of the approach used, direct vehicle to vehicle communication would allow for enhanced (even sub-wavelength) range resolution. The communication technique employed may be selected based on the relative proximity or locations of the self-driving vehicles and/or their communication capabilities, as well as the estimated location of the honker. For instance, in one scenario a low-latency communication approach may be selected if the sound-emitting object is right in front (e.g., within 30-80 meters) of the vehicle at high speed (e.g., 50-65 mph) and driving decisions need to be made within a fraction of a second as to how to respond (e.g., lane change, hard braking, etc.).

Upon receipt of a set of acoustic-related information from another nearby self-driving vehicle, the receiving vehicle may evaluate this information in different ways. For instance, the received data may be processed in the same way that data obtained directly by the vehicle is processed. Here, to the extent that multiple microphones or other sound transducers on the vehicle constitute an acoustic array, the receipt of audio information from one or more other self-driving vehicles effectively creates an array of acoustical arrays with which to perform triangulation, trilateration or another form of location determination for the sound source. In one example, each nearby vehicle performs its own data analysis on all of the received acoustic-related information as well as the vehicle's own obtained sound data. This enables each self-driving vehicle to independently identify the location of the sound source. The results may be shared for comparison, or simply used by each respective vehicle. As part of the analysis, each vehicle may perform noise cancellation, account for sound echoes and/or occlusions, identify a change in pitch due to object or self-driving vehicle movement, filter the sound to limit it to a specific frequency band(s), amplify a part of the signal, etc. In one scenario, a given self-driving vehicle may drop some or all of the data if the vehicle's processing system determines that such data is not relevant to its driving (e.g., the information is related to objects in an adjacent parking lot.

In another example, one particular self-driving vehicle may be selected as the primary processor to avoid duplication of processing efforts. Here, while each self-driving vehicle may process the acoustic information directly obtained by that vehicle, the selected vehicle may be the only vehicle to also evaluate the data received from the other nearby vehicles. This may reduce the amount of information transmitted among the vehicles, in addition to reducing the processing requirements at each vehicle. For instance, the processing vehicle could be selected by a round-robin approach, could be the vehicle with the lexicographically lowest license plate number, could be based on a random ordering of vehicles that is renewed daily, or the one that has the least current computational load. Alternatively, the back-end system could select the vehicle.

And in yet another example, offboard processing of the acoustic-related information may be performed by a back-end system in place of or in conjunction with processing of some or all of the data locally by one or more of the self-driving vehicles. The back-end system may perform fleet management operations, and may be capable of real time direct communication with some or all of the self-driving vehicles in the vicinity of the detected sound. In this example, the back-end system may have more processing resources available to it than each individual self-driving vehicle. Thus, even with small end-to-end communication delays, the back-end system may be able to perform a robust audio analysis so that the location of the noise emitter is properly localized (e.g., to a single object along a roadway segment). More information about the back-end system is provided below.

As noted above, acoustical and other information may be processed to generate a likelihood region and/or a highly localized region from which the horn honk or other sound emanated. This can include triangulation, trilateration or other signal processing techniques used to identify the location of a sound signal. The evaluation may use the direction-of-arrival and timestamp, either with or without other data such as the frequency band(s), pitch or Doppler shift information, amplitude, harmonics, information indicating duration and/or repetition of the sound, etc. This can include estimating the velocity and orientation of the object issuing the noise relative to the self-driving vehicle(s), or filters such as a Kalman filter that take in estimated bearings and estimated ranges, and/or corresponding probability distributions, over time, and output other state estimates, such as estimated relative velocities. In one example, estimated bearings may be determined using various algorithms such as a generalized cross correlation phase transform. In another example, estimated ranges may be computed analytically from the amplitude of the pressure sensed by the microphone array(s), using the knowledge a range of noise volumes at a fixed distance and that pressure falls off according to 1/range.

In some examples, machine learning models, which may include neural networks, can be trained on horn honks, sirens, shouts and other types of acoustical information. This may be done for different types of driving environments, including freeways, urban, suburban and rural surface streets, tunnels, bridges, etc., both with and without other nearby objects (e.g., cars or other vehicles on the roadway, adjacent buildings, vegetation, roadway dividers). The training may be based on gathered real-world data, for instance with particular sound types in a single environment or different environments (e.g., that is labeled according to sound type, location type, environmental conditions such as humidity, time of day, temperature, etc.) From this, one or more acoustic models may be developed and used in real-time signal evaluation by the self-driving vehicles, after the fact evaluation by the back-end system, or both. By way of example, the model structure may be a deep net, where the exact structure and parameters can be searched through automated machine learning, e.g., using a Neural Architecture Search (NAS) type model.

As a result of the data analysis and evaluation of information received from multiple self-driving vehicles in the same general vicinity (e.g., within 1-3 blocks, less than 500 meters, within line of sight, etc.), a specific vehicle or other object may be identified in a highly localized region as being the source of a horn honk or other noise. In one scenario, this may involve determining the sources of multiple horn honks from different vehicles, which may have the same or similar frequencies, such as can occur in gridlocked traffic during rush hour, either on a freeway, highway or surface street. In another example, this approach can localize one or more emergency vehicles that have their sirens on. As part of this, the system may discern which emergency vehicles are police vehicles, fire trucks and/or ambulances. And in a further example, it may be possible to identify whether a driver, bicyclist or other road user is shouting.

The information obtained by acoustical sensors of one self-driving vehicle may be used to validate the acoustical sensors of one or more other nearby self-driving vehicles. This may be done using one or more sound samples received from objects in the environment. For instance, evaluating the sound samples and timestamps can help determine whether a given microphone is detecting sounds at a lower amplitude than other microphones in the acoustical array for a particular vehicle.

Horn honks, sirens, shouting and other audible noises may be indicative of a current or imminent situation along the roadway. By way of example only, the noise(s) may indicate a crash, a vehicle moving where there is a blind spot (e.g., backing out of a parking spot), an unprotected turn, a flooded roadway, animals crossing the road, etc. Identifying the source(s) of the noise(s) enables the self-driving vehicle(s) and/or back-end system to determine whether the noise is specifically directed at that vehicle, at another vehicle, a general notification or warning, etc. In one scenario, this may be a matching problem that the onboard computer system can solve, either with the noise type and noise source's location alone, or in conjunction with other data such as sensor information from lidar or camera modules. Here, the sensor information from different self-driving vehicles may aid the analysis, for instance by giving a precise pose of the object or direction of the noise.

Based on this, the onboard system (e.g., planner module and/or navigation system of the vehicle's autonomous driving system) can evaluate whether a honk or other noise indicates that the vehicle is not doing something correctly, efficiently or as effectively as possible, such as taking too long to make a turn, or not proceeding immediately once a traffic light turns green. This information could be used to modify the current driving action. It could also be used in a reinforcement learning process. By way of example only, the reinforcement learning process may show that once a left or right turn arrow turns green, the vehicle should wait no more than 2-3 seconds before making the turn, because long delays may result in honks by one or more vehicles behind the self-driving vehicle. Even if the horn honk or other noise is not directed at the particular self-driving vehicle, the information obtained from the analysis could be used in a reinforcement learning process to adjust behavior in applicable future situations. The evaluated information may also be shared with the other nearby self-driving vehicles and/or communicated with a back-end system for fleet-wide management, where it can be logged and utilized, e.g., as part of an offline training process. Such behavior information, including how nearby vehicles and other road users react to the self-driving vehicle, can provide useful metrics, such as those relating to customer satisfaction.

Also, because a horn honk may be used by a driver of another vehicle to communicate different types of information. In one instance this may be a "friendly" honk, where another road user is signaling they are ceding the right of way. In other instances, the honking may indicate that the driver is frustrated or angry and is more likely to behave unexpectedly or outside of a typical behavior model (e.g., cut-in, suddenly accelerate, tailgate). In this type of situation, the system may select a different behavioral model when predicting the other driver's behavior in the planner module. In one scenario, a likely end result if frustration is suspected would be that the self-driving vehicle slows down to behave more cautiously around this road user that is likely going to be less predictable, giving the vehicle more time to take alternative courses of action if warranted.

As noted above, the technology is applicable for various types of vehicles, including passenger cars, buses, motorcycles, emergency vehicles, RVs, construction vehicles, and large trucks or other cargo carrying vehicles. In addition to using the audio source location information for operation of an individual self-driving vehicle, this information may also be shared with other self-driving vehicles, such as vehicles that are part of a fleet.

Figure 8A:
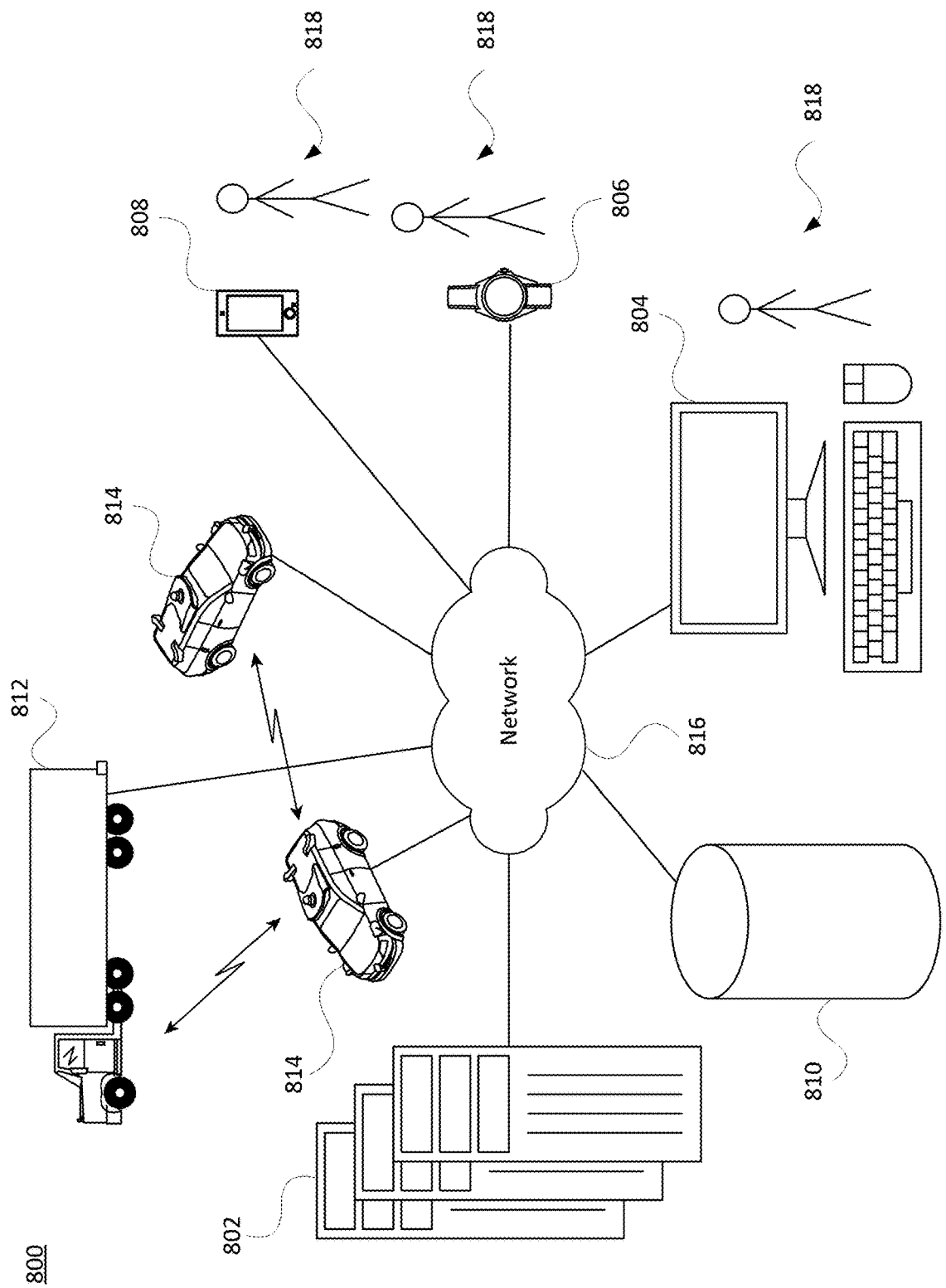
FIGS. 8A-B illustrate an example system in accordance with aspects of the technology.
Figure 8B:
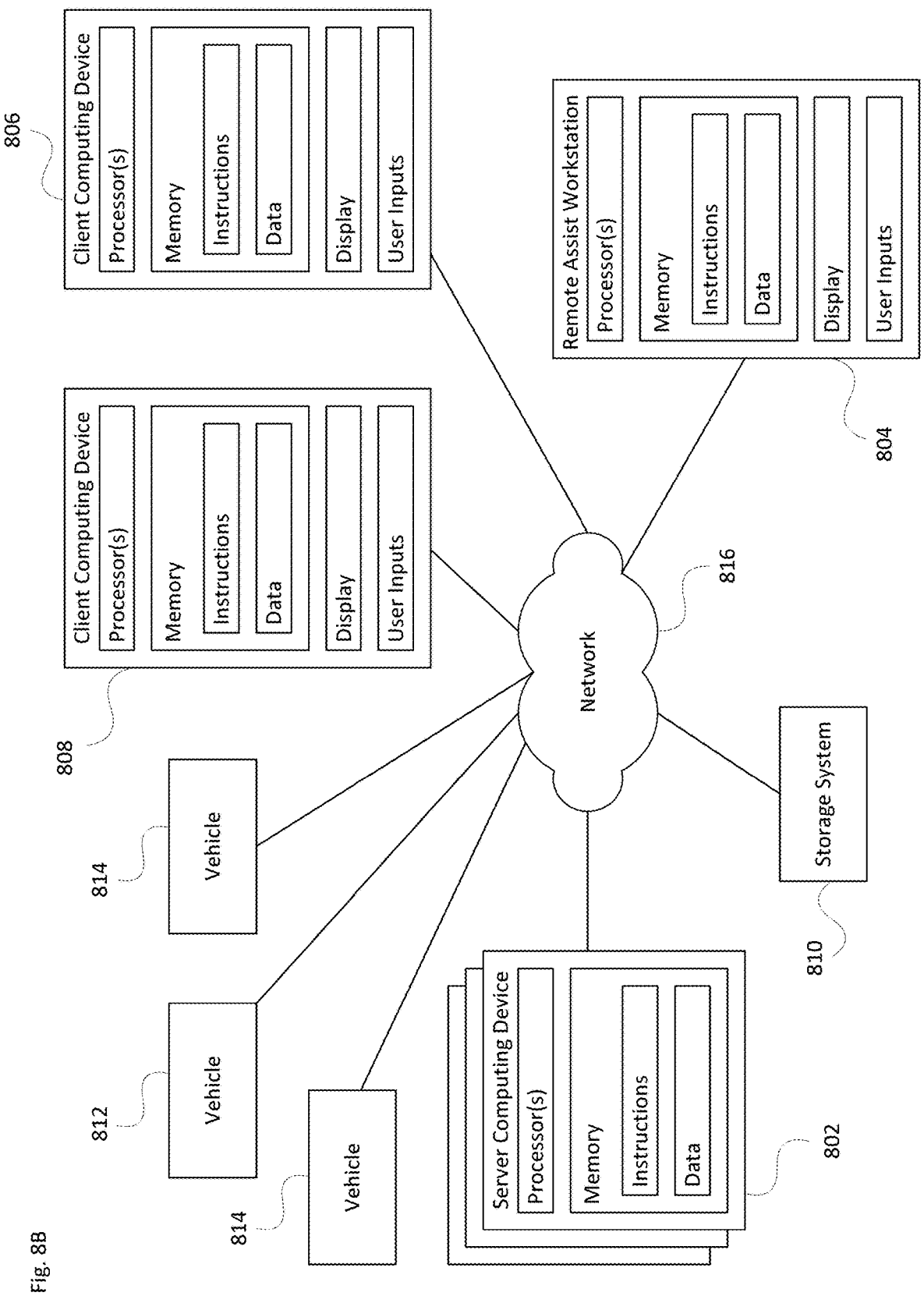

One example of this is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100 and 150 of FIGS. 1A-B and 1C-D, respectively. Vehicles 812 and/or vehicles 814 may be part of a fleet of vehicles. Although only a few vehicles and computing devices are depicted for simplicity, a typical system may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communication directly or indirectly via one or more networks, such as network 816. The network 816, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of self-driving vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 816 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with drivers of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help determine the source of a horn honk or other noise, to determine whether that noise is directed towards a particular self-driving vehicle, what the purpose of the horn honk or other noise is, and/or appropriate responses by the self-driving vehicle to the noise. The result of this evaluation may be provided to one or more vehicles in the vicinity of the noise. Additionally, this also might be the process used for obtaining labeled data to: 1) evaluate the accuracy of this localization scheme; and 2) train any nets involved.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may also store autonomous vehicle control software which is to be used by vehicles, such as vehicles 812 or 814, to operate such vehicles in an autonomous driving mode. Storage system 810 may also store driver-specific or nominal driving models, as well as acoustical models and training data for different types of noises. The model information may be shared with specific vehicles or the fleet as needed. It may be updated in real time, periodically, or off-line as additional driving information is obtained. The storage system 810 can also include map information, route information, weather information, etc. This information may be shared with the vehicles 812 and 814, for instance to help with behavior analysis by the on-board computer system(s), such as during real-time driving by a particular vehicle when a horn honk or other noise is detected in the vehicle's external environment.

FIG. 9 illustrates an example method of operation 900 in accordance with the above discussions for operating a vehicle in an autonomous driving mode. At block 902, the method includes obtaining, by one or more acoustical sensors of a perception system of the vehicle, audio sensor data. The one or more acoustical sensors are configured to detect sounds in an external environment around the vehicle. At block 904, the method includes receiving, by one or more processors of the vehicle, audio sensor data from one or more other vehicles operating in an autonomous driving mode. The received audio sensor data includes direction-of-arrival and timestamp information regarding a detected sound from the external environment. At block 906, the processors evaluate the obtained audio sensor data and the received audio sensor data based on a location of the vehicle and locations of the one or more other vehicles associated with the timestamp information to identify an estimated location at which a specific sound emanated and a particular object that likely issued the specific sound. And at block 908, based on a type of the specific sound, the estimated location, and a type of the particular object, the one or more processors control operation of the vehicle in the autonomous driving mode. This can include making an immediate change to a current driving action (e.g., slowing down, changing lanes or pulling over in the case of a siren or aggressive horn honk). If the specific sound is an indication that another driver is ceding the right of way to the vehicle, then the vehicle may commence with a particular driving action (e.g., making a turn, proceeding through an intersection, etc.).

Figure 10:
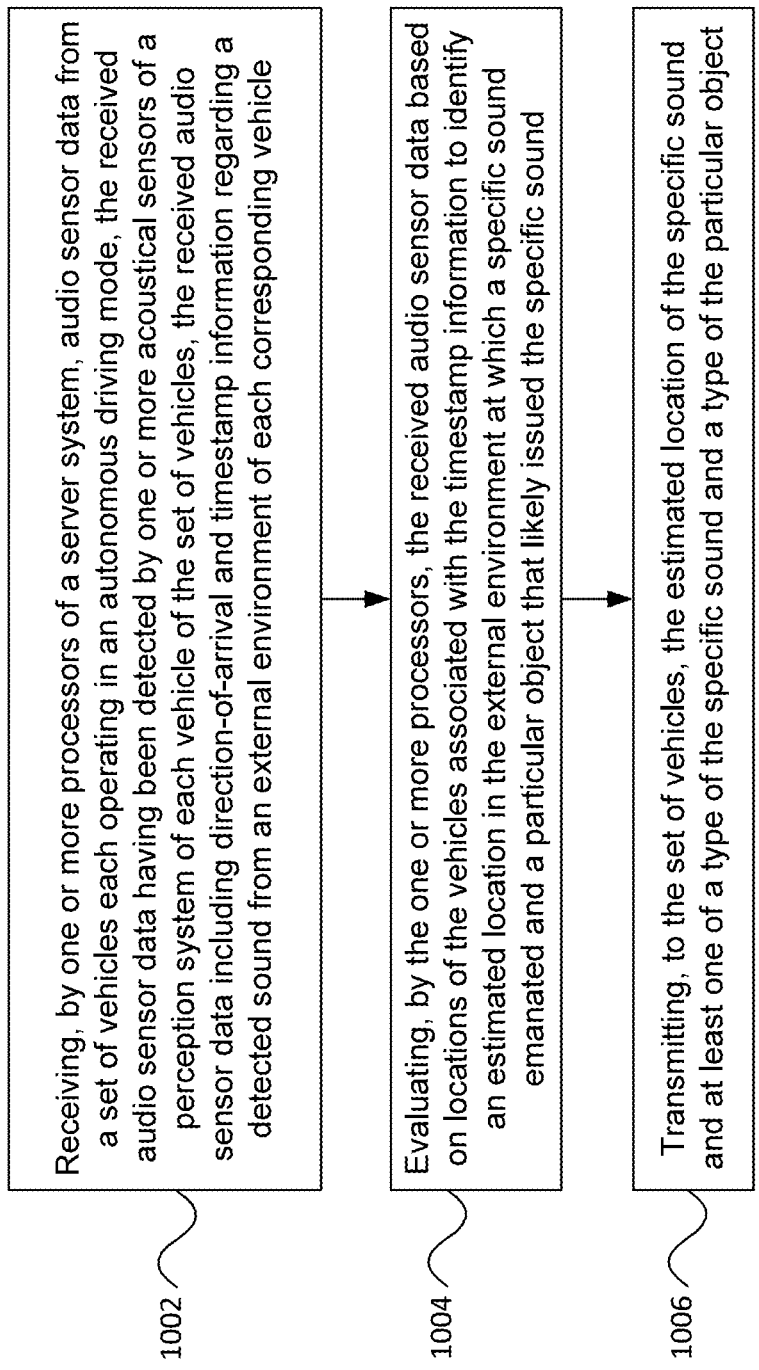
FIG. 10 illustrates another example method in accordance with aspects of the technology.

And FIG. 10 illustrates an example method 1000 of assisting one or more vehicles operating in an autonomous driving mode. At block 1002, the method includes receiving, by one or more processors of a server system (e.g., server computing device 802), audio sensor data from a set of vehicles each operating in an autonomous driving mode. The received audio sensor data has been detected by one or more acoustical sensors of a perception system of each vehicle of the set of vehicles. The received audio sensor data includes direction-of-arrival and timestamp information regarding a detected sound from an external environment of each corresponding vehicle. At block 1004, the method includes evaluating, by the one or more processors, the received audio sensor data based on locations of the vehicles associated with the timestamp information to identify an estimated location in the external environment at which a specific sound emanated and a particular object that likely issued the specific sound. And at block 1006, the method includes transmitting, to the set of vehicles, the estimated location of the specific sound and at least one of a type of the specific sound and a type of the particular object. This enables each vehicle to take corrective action as needed (e.g., slowing down, changing lanes or pulling over in the case of a siren or aggressive horn honk). Or, similar to block 908, if the specific sound is an indication that another driver is ceding the right of way to a given vehicle of the set, then that vehicle may commence with a particular driving action (e.g., making a turn, proceeding through an intersection, etc.).

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
    obtaining, by one or more acoustical sensors of a perception system of a first vehicle operating in an autonomous driving mode, first audio sensor data of a first instance of a sound emanated in an external environment around the first vehicle, the one or more acoustical sensors being configured to detect the sound;
    receiving, by one or more processors of the first vehicle, second audio sensor data of the first instance of the sound from one or more second vehicles operating in the autonomous driving mode, the second audio sensor data including a direction-of-arrival and a timestamp;
    determining, by the one or more processors based on the first audio sensor data, the second audio sensor data, a location of the first vehicle at the timestamp, and respective locations of the one or more second vehicles at the timestamp, an estimated location of the first instance of the sounds;
    determining, by the one or more processors based on the first audio sensor data, the second audio sensor data, the location of the first vehicle at the timestamp, and respective locations of the one or more second vehicles at the timestamp, a particular object from which the first instance of the sound emanated;
    determining, by the one or more processors based on the first audio sensor data and the second audio sensor data, a type of the sound; and
    modifying, by the one or more processors based on the type of the sound, the estimated location of the first instance of the sound, and a type of the particular object, a driving operation of the first vehicle operating in the autonomous driving mode.

2. The method of claim 1, further comprising determining, by the one or more processors based on non-acoustical sensor data, at least one of the estimated location of the sound or the type of the particular object.

3. The method of claim 2, further comprising receiving the non-acoustical sensor data from the one or more second vehicles.

4. The method of claim 1, further comprising determining, by the one or more processors, whether the type of the sound is a horn honk or a siren.

5. The method of claim 1, wherein determining the estimated location of the sound includes evaluating, by the one or more processors, the second audio sensor data according to positions of each acoustical sensor of an array of sensors from each of the one or more second vehicles.

6. The method of claim 1, wherein determining the estimated location of the sound includes determining, by the one or more processors based on a pose of the first vehicle and respective poses of each of the one or more second vehicles, the estimated location of the sound.

7. The method of claim 1, further comprising:
    identifying, by the one or more processors based on the first audio sensor data, a first likelihood region as associated with the estimated location of the sound;
    identifying, by the one or more processors based on the second audio sensor data, one or more second likelihood regions associated with the estimated location of the sound; and
    identifying, by the one or more processors, a localized region associated with the estimated location of the sound by comparing the first likelihood region and the one or more second likelihood regions.

8. The method of claim 1, further comprising determining, by the one or more processors, whether the sound relates to operation of the first vehicle in the autonomous driving mode.

9. The method of claim 8, further comprising adjusting, by the one or more processors, a driving operation of the first vehicle in response to determining that the sound relates to the operation of the first vehicle in the autonomous driving mode.

10. The method of claim 8, further comprising using a determination that the sound relates to the operation of the first vehicle in the autonomous driving mode in a reinforcement learning process.

11. The method of claim 1, further comprising transmitting the first audio sensor data to:
    at least one of the one or more second vehicles, or
    a back-end server system, wherein the back-end server system is remote from the first vehicle and the one or more second vehicles.

12. The method of claim 11, further comprising transmitting non-acoustical sensor data to at least one of:
    the at least one of the one or more second vehicles, or
    the back-end server system.

13. The method of claim 1, further comprising selecting the one or more second vehicles based on at least one of a proximity to the first vehicle, an estimated proximity to the particular object, a driving condition, or an environmental condition.

14. The method of claim 13, further comprising pre-processing the first audio sensor data to perform one or more of noise cancellation, filtering, signal averaging or signal boosting.

15. The method of claim 14, wherein the pre-processing includes pre-processing multiple samples of the first audio sensor data to account for one or more of: (i) changes over time in positioning of the one or more acoustical sensors of the perception system of the first vehicle, (ii) signal attenuation, or (iii) a Doppler shift caused by relative movement of the particular object and the first vehicle.

16. The method of claim 1, wherein receiving the second audio sensor data includes one of: (i) directly receiving the second audio sensor data from the one or more second vehicles, or (ii) indirectly receiving the second audio sensor data from a back-end server system.

17. The method of claim 1, further comprising:
evaluating a change in the sound over time; and
adjusting operation of the first vehicle in the autonomous driving mode based on the change in the sound over time.

18. A method comprising:
receiving, by one or more processors of a server system from a set of vehicles, audio sensor data of a sound emanated in an external environment around the set of vehicles, each vehicle of the set of vehicles operating in an autonomous driving mode, the audio sensor data having been detected by one or more acoustical sensors of a perception system of each vehicle of the set of vehicles, the audio sensor data including a direction-of-arrival and a timestamp of the sound corresponding to each vehicle of the set of vehicles;
determining, by the one or more processors based on the audio sensor data and a respective location of each vehicle of the set of vehicles at the timestamp, an estimated location of the sound;
determining, by the one or more processors based on the audio sensor data and a respective location of each vehicle of the set of vehicles at the timestamp, a particular object from which the sound emanated;
transmitting, by the one or more processors to the set of vehicles, (i) the estimated location of the sound and (ii) at least one of a type of the sound and a type of the particular object; and
causing, by the one or more processors based on (i) the estimated location of the sound and (ii) at least one of the type of the sound and the type of the particular object, at least one vehicle of the set of vehicles to modify a driving operation of the at least one vehicle operating in the autonomous driving mode.

19. The method of claim 18, further comprising:
identifying, by the one or more processors based on the audio sensor data, a plurality of likelihood regions associated with the estimated location of the sound; and
identifying, by the one or more processors, a localized region associated with the estimated location of the sound by comparing the plurality of likelihood regions;
wherein transmitting the estimated location of the sound includes transmitting the localized region to the set of vehicles.

20. The method of claim 18, further comprising determining, by the one or more processors, whether the sound relates to operation of a given one of the set of vehicles.

21. The method of claim 1, further comprising:
subsequent to modifying the driving operation of the first vehicle, obtaining, by the one or more acoustical sensors, third audio sensor data of a second instance of the sound emanated in the external environment around the first vehicle; and
in response to obtaining the third audio sensor data, executing, by the one or more processors, the modified driving operation.

22. The method of claim 21, wherein executing the modified driving operation includes executing, by the one or more processors according to a reinforcement learning process, the modified driving operation.

* * * * *

UNITED STATES PATENT AND TRADEMARK OFFICE
CERTIFICATE OF CORRECTION

PATENT NO. : 11,958,505 B2
APPLICATION NO. : 16/934132
DATED : April 16, 2024
INVENTOR(S) : Nicholas Armstrong-Crews It is certified that error appears in the above-identified patent and that said Letters Patent is hereby corrected as shown below:

In the Claims

Column 23, Line 61 Claim 1:
Now reads: "instance of the sounds"; should read -- instance of the sound --

Signed and Sealed this
Fourth Day of June, 2024

Katherine Kelly Vidal
Director of the United States Patent and Trademark Office